US008830863B2

(12) United States Patent
Novak et al.

(10) Patent No.: US 8,830,863 B2
(45) Date of Patent: Sep. 9, 2014

(54) SYSTEM AND METHOD FOR DYNAMIC COORDINATION OF RADIO RESOURCES USAGE IN A WIRELESS NETWORK ENVIRONMENT

(75) Inventors: Robert Novak, Sittsville (CA); David Steer, Nepean (CA); Dongsheng Yu, Nepean (CA)

(73) Assignee: BlackBerry Limited, Waterloo (CA)

( * ) Notice: Subject to any disclaimer, the term of this patent is extended or adjusted under 35 U.S.C. 154(b) by 83 days.

(21) Appl. No.: 13/611,984

(22) Filed: Sep. 12, 2012

(65) Prior Publication Data
US 2013/0003591 A1    Jan. 3, 2013

Related U.S. Application Data

(60) Continuation of application No. PCT/CA2011/050265, filed on May 2, 2011, which is a division of application No. PCT/CA2010/001463, filed on Sep. 23, 2010.

(51) Int. Cl.
| | |
|---|---|
| G01R 31/08 | (2006.01) |
| H04L 12/28 | (2006.01) |
| H04W 4/00 | (2009.01) |
| H04W 72/08 | (2009.01) |
| H04W 28/02 | (2009.01) |
| H04W 24/10 | (2009.01) |
| H04W 24/00 | (2009.01) |
| H04W 84/18 | (2009.01) |

(52) U.S. Cl.
CPC ........ H04W 72/085 (2013.01); *H04W 28/0252* (2013.01); *H04W 28/0231* (2013.01); *H04W 24/10* (2013.01); *H04W 24/00* (2013.01); *H04W 84/18* (2013.01)
USPC ............................. 370/252; 370/256; 370/338

(58) Field of Classification Search
CPC ............ H04W 24/10; H04W 28/0231; H04W 28/0252
USPC ................................... 370/252–256, 335–338
See application file for complete search history.

(56) References Cited

U.S. PATENT DOCUMENTS

| 7,953,020 B2 * | 5/2011 | Breslau et al. ................. 370/252 |
| 2002/0046299 A1 | 4/2002 | Lefeber et al. |

(Continued)

FOREIGN PATENT DOCUMENTS

| TW | 200520440 A1 | 6/2005 |
| TW | 201015927 A1 | 4/2010 |

(Continued)

OTHER PUBLICATIONS

EPO, Communication Pursuant to Rules 161(2) and 162 EPC, Application No. 10857413.8, May 2, 2013, 2 pgs.

(Continued)

*Primary Examiner* — Brandon Renner
(74) *Attorney, Agent, or Firm* — The Danamraj Law Group, P.C.

(57) ABSTRACT

An architecture, system and associated method for dynamic coordination of radio resource usage in a network environment. In one aspect, a method of processing sensory reports of one or more sensing elements in a radio network comprises receiving a sensory report from a sensing element operating in multiple radio access technologies, the sensory report including sensory data associated with multiple radio channels relative to at least one radio element; identifying the sensing element's identity and determining if the sensory report has been tagged with a code generated by a predetermined code generator; responsive to the identifying and the determining, authenticating the sensory report; and correlating the sensory report from the sensing element with at least one of one or more previous sensory reports from the sensing element and one or more previous sensory reports received from another sensing element.

30 Claims, 21 Drawing Sheets

(56) References Cited

U.S. PATENT DOCUMENTS

| | | |
|---|---|---|
| 2007/0153758 A1 | 7/2007 | Kang et al. |
| 2008/0014957 A1* | 1/2008 | Ore .......................... 455/452.1 |
| 2008/0144522 A1 | 6/2008 | Chang et al. |
| 2008/0188223 A1* | 8/2008 | Vesterinen et al. ........... 455/436 |
| 2008/0253336 A1 | 10/2008 | Parkvall et al. |
| 2009/0143019 A1 | 6/2009 | Shellhammer |
| 2009/0215451 A1 | 8/2009 | Lim et al. |
| 2010/0329180 A1 | 12/2010 | Rao et al. |
| 2011/0286421 A1 | 11/2011 | Hu |
| 2013/0005240 A1 | 1/2013 | Novak et al. |

FOREIGN PATENT DOCUMENTS

| | | |
|---|---|---|
| WO | 2009022835 | 2/2009 |
| WO | 2009027953 | 3/2009 |
| WO | 2012037637 | 3/2012 |
| WO | 2012037669 | 3/2012 |
| WO | 2012037670 | 3/2012 |

OTHER PUBLICATIONS

EPO, Communication Pursuant to Rules 161(2) and 162 EPC, Application No. 11826265.8, May 2, 2013, 2 pgs.

EPO, Communication Pursuant to Rules 161(2) and 162 EPC, Application No. 11826266.6, May 2, 2013, 2 pgs.

USPTO, Notice of Publication of Application, U.S. Appl. No. 13/611,757, Mar. 14, 2013, 1 pg.

EPO, Communication of European Publication, Application No. 10857413.8, Jul. 3, 2013, 1 pg.

EPO, Communication of European Publication, Application No. 11826265.8, Jul. 3, 2013, 1 pg.

EPO, Communication of European Publication, Application No. 11826266.6, Jul. 3, 2013, 1 pg.

PCT, Search Report and Written Opinion, PCT/CA2010/001463, Jun. 27, 2011, 10 pgs.

PCT, Search Report and Written Opinion, PCT/CA2011/050265, Feb. 8, 2011, 8 pgs.

PCT, Search Report and Written Opinion, PCT/CA2011/050266, Aug. 4, 2011, 7 pgs.

ESTI TR 102 682 V1.1.1, Reconfigurable Radio Systems (RRS); Functional Architecture (FA) for the Management and Control of Reconfigurable Radio System, Jul. 2009, 45 pgs.

ETSI Tr 102 683 V1.1.1, Reconfigurable Radio Systems (RRS); Cognitive Pilot Channel (CPC), Sep. 2009, 38 pgs.

PCT, Notification Concerning Transmittal of International Preliminary Report on Patentability, Application No. PCT/CA2010/001463, Apr. 4, 2013, 8 pgs.

PCT, Notification Concerning Transmittal of International Preliminary Report on Patentability, Application No. PCT/CA2011/050265, Apr. 4, 2013, 5 pgs.

USPTO, Office Action, U.S. Appl. No. 13/611,757, Apr. 8, 2014, 7 pgs.

USPTO, Interview Summary, U.S. Appl. No. 13/611,757, Jun. 12, 2014, 6 pgs.

TIPO, Office Action, Application No. 100134197, Apr. 23, 2014, 5 pgs.

* cited by examiner

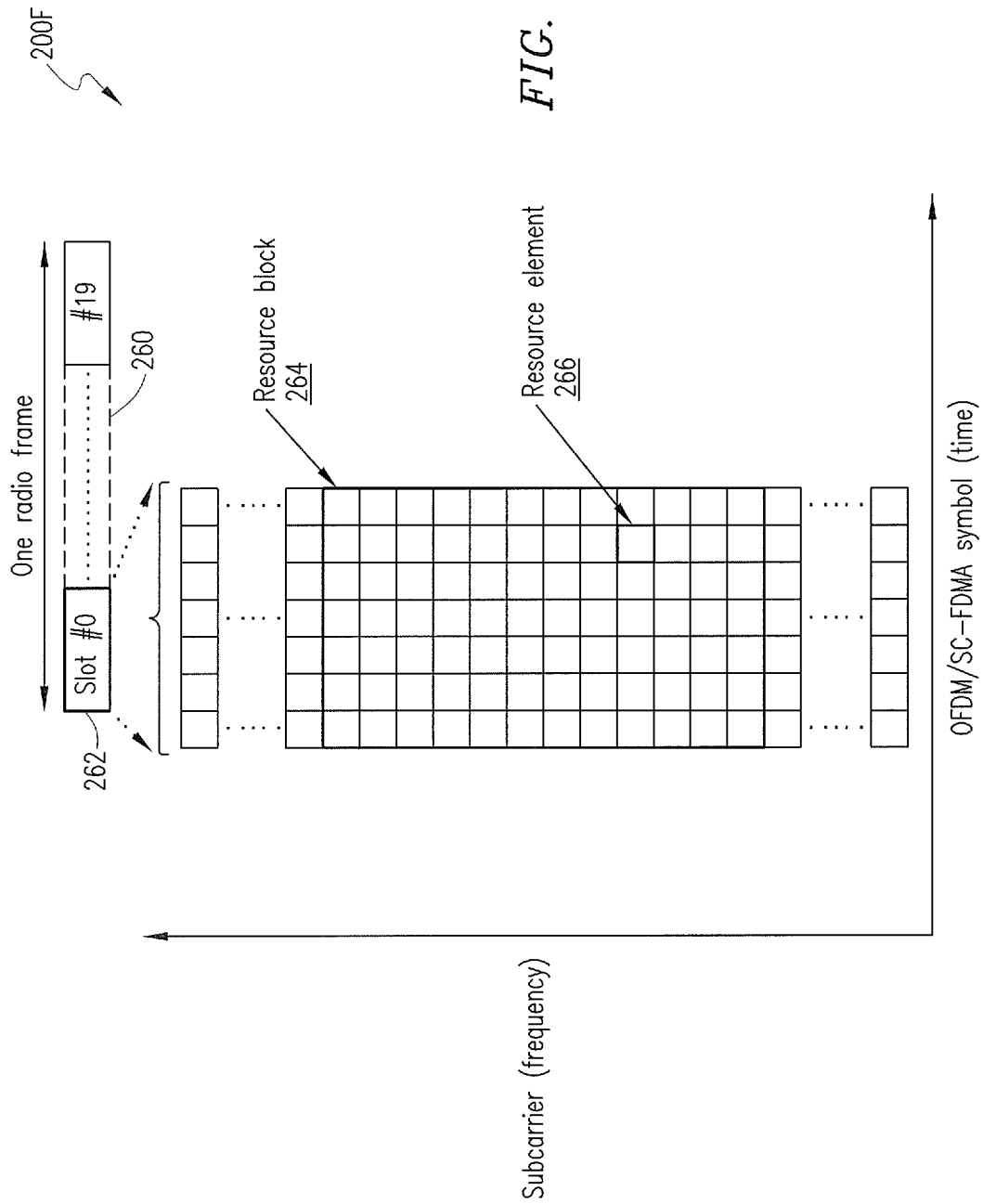

SYSTEM AND METHOD FOR DYNAMIC COORDINATION OF RADIO RESOURCES USAGE IN A WIRELESS NETWORK ENVIRONMENT

CROSS-REFERENCE TO RELATED APPLICATION(S) & CLAIM OF PRIORITY

This application, being filed pursuant to 35 U.S.C. §111(a), is a continuation and claims the benefit of, and priority, under 35 U.S.C. §§120 and 365(c), to International Application No. PCT/CA2011/050265, filed May 2, 2011 having the title "SYSTEM AND METHOD FOR DYNAMIC COORDINATION OF RADIO RESOURCES USAGE IN A WIRELESS NETWORK ENVIRONMENT", which itself claims priority to International Application No. PCT/CA2010/001463, filed Sep. 23, 2010 having the title "SYSTEM AND METHOD FOR DYNAMIC COORDINATION OF RADIO RESOURCES USAGE IN A WIRELESS NETWORK ENVIRONMENT". The contents of the above-noted patent applications are hereby expressly incorporated by reference into the detailed description hereof. Additionally, this application discloses subject matter related to the subject matter of the following U.S. patent application(s): (i) "SYSTEM AND METHOD FOR DYNAMIC COORDINATION OF RADIO RESOURCES USAGE IN A WIRELESS NETWORK ENVIRONMENT" application Ser. No. 13/611,757, filed even date herewith, in the name(s) of Robert Novak, David Steer and Dongsheng Yu; and (ii) "SYSTEM AND METHOD FOR DYNAMIC COORDINATION OF RADIO RESOURCES USAGE IN A WIRELESS NETWORK ENVIRONMENT", application Ser. No. 13/612,189, filed even date herewith, in the name(s) of Robert Novak, David Steer and Dongsheng Yu; each of which is hereby incorporated by reference.

FIELD OF THE DISCLOSURE

The present patent disclosure generally relates to mobile telecommunications networks. More particularly, and not by way of any limitation, the present patent disclosure is directed to providing dynamic coordination of radio resource usage in a network environment.

BACKGROUND

In operation of mobile communications networks in spectra shared with other systems an ongoing issue relates to assigning channels among the diverse systems without interference. In the shared or pooled spectrum, for example, lightly licensed or "white space" bands, there may be multiple networks, sources, and radio access technologies operating in the same geographic location as well as time-frequency spectra. Further, some channels may be unused by some systems or become available in local geographical locations at some times. Additionally, some channels may also be congested due to traffic or interference.

BRIEF DESCRIPTION OF THE DRAWINGS

A more complete understanding of the embodiments of the present patent disclosure may be had by reference to the following Detailed Description when taken in conjunction with the accompanying drawings wherein:

FIG. 2F depicts an example resource grid where resource elements may be allocated relative to the example network of FIG. 2A according to an embodiment of the present disclosure;

DETAILED DESCRIPTION OF THE DRAWINGS

Figure 1A:
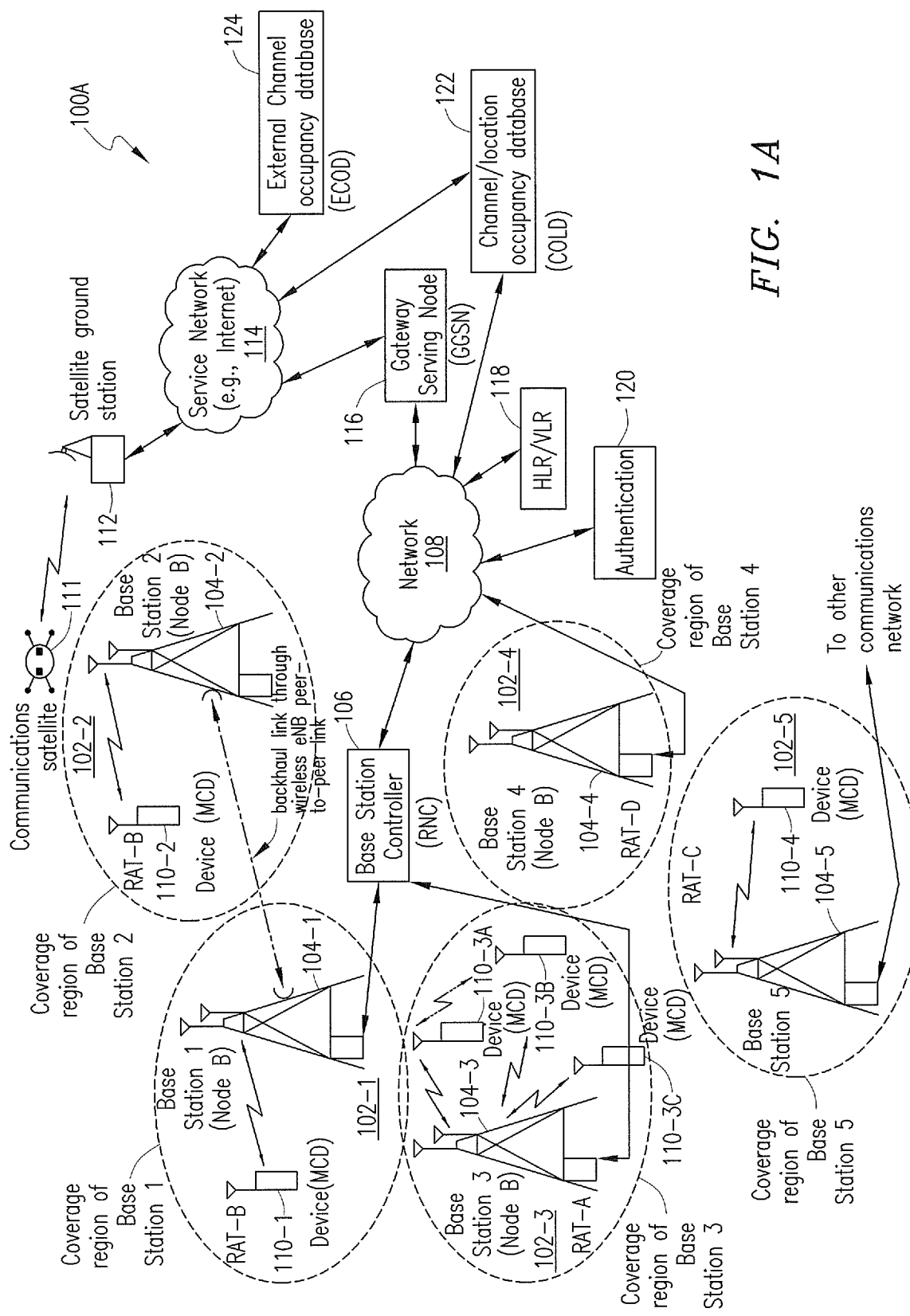
FIG. 1A depicts an example radio network environment wherein radio resources may be managed in accordance with an embodiment of the present patent application.

The present patent disclosure is broadly directed to providing dynamic coordination of resource usage in a diverse radio network environment. Various network elements, e.g., user equipment (UE) devices, base stations, and other nodes are configured to operate as a sensor network across one or more radio access technologies (RATs) to improve the efficiency and capacity of a mobile communications network.

In one aspect, an embodiment of a radio resource management method utilizing multiple RATs in a communications network is disclosed. The claimed embodiment comprises the following acts: scanning, by a sensing element, multiple radio frequency spectra for detecting sensory data associated with multiple radio channels relative to a first radio element; communicating the sensory data to a network node; and based on the detected sensory data, allocating a radio resource to a second radio element.

In another aspect, an embodiment of a radio resource management system or apparatus is disclosed. The claimed embodiment comprises: a component configured to receive sensory data from one or more sensing elements operating in multiple RATs and multiple radio frequency spectra; a component configured to process the sensory data received from the one or more sensing elements; and a component configured to send a control message, based on the processing, for effectuating allocation of a radio resource to at least one radio element operating in a radio network environment.

In a further aspect, an embodiment of a wireless user equipment (UE) device is disclosed, wherein the claimed embodiment comprises: a processor configured to control at least one of a plurality of subsystems to scan multiple radio frequency spectra for detecting sensory data associated with multiple radio channels relative to one or more radio elements; the processor further configured to control at least one of the plurality of subsystems to generate a message for reporting at least a portion of the sensory data to at least network node; and the processor further configured to control at least one of the plurality of subsystems to process a control message received from one of the network nodes for facilitating allocation of a radio resource to the wireless UE device.

In a further aspect, disclosed herein is an embodiment of method of processing sensory reports of one or more sensing elements in a distributed channel occupancy and location database (COLD) system. The claimed embodiment comprises one or more of the following acts: receiving a sensory report from a sensing element operating in multiple RATs, the sensory report including sensory data associated with multiple radio channels relative to at least one radio element; identifying the sensing element's identity and determining if the sensory report has been tagged with a code generated by a predetermined code generator; responsive to the identifying and the determining, authenticating the sensory report; and correlating the sensory report from the sensing element with at least one of one or more previous sensory reports from the sensing element and one or more previous sensory reports received from another sensing element. In one implementation, another embodiment of a method of processing sensory reports of one or more sensing elements in a radio network comprises: receiving a sensory report from a sensing element operating in multiple radio access technologies, the sensory report including sensory data associated with multiple radio channels relative to at least one radio element; identifying the sensing element's identity and determining if the sensory report has been tagged with a code generated by a predetermined code generator; responsive to the identifying and the determining, authenticating the sensory report; and correlating the sensory report from the sensing element with at least one of one or more previous sensory reports from the sensing element and one or more previous sensory reports received from another sensing element to facilitate alleviating channel interference or congestion.

In a related aspect, disclosed herein is an embodiment of an apparatus for processing sensory reports of one or more sensing elements in a distributed COLD system. The claimed embodiment comprises one or more of the following features: a component configured to receive a sensory report from a sensing element operating in multiple RATs, the sensory report including sensory data associated with multiple radio channels relative to at least one radio element; a component configured to identify the sensing element's identity and to determine if the sensory report has been tagged with a code generated by a predetermined code generator; a component configured to authenticate the sensory report; and a component configured to correlate the sensory report from the sensing element with at least one of one or more previous sensory reports from the sensing element and one or more previous sensory reports received from another sensing element. In one implementation, yet another embodiment of an apparatus for processing sensory reports of one or more sensing elements disposed in a radio network is disclosed. In this configuration, the claimed embodiment comprises: a component configured to receive a sensory report from a sensing element operating in multiple radio access technologies, the sensory report including sensory data associated with multiple radio channels relative to at least one radio element; a component configured to identify the sensing element's identity and to determine if the sensory report has been tagged with a code generated by a predetermined code generator; a component configured to authenticate the sensory report; and a component configured to correlate the sensory report from the sensing element with at least one of one or more previous sensory reports from the sensing element and one or more previous sensory reports received from another sensing element to facilitate alleviating interference or congestion.

In a still further aspect, disclosed herein is an embodiment of a method operable with a wireless UE device in a radio communications environment utilizing multiple radio access technologies. The claimed embodiment comprises one or more of the following acts: scanning multiple radio frequency spectra for detecting sensory data associated with multiple radio channels relative to at least one radio element in a sensing area of the wireless UE device; determining if the wireless UE device is out of range of a wide area cellular network; responsive to the determining, establishing a short-range wireless communication path with another wireless UE device having a wide area cellular communication connection; and transmitting the sensory data to the another wireless UE device for reporting to a network element associated with the wide area cellular network.

In a related aspect, disclosed herein is another embodiment of a wireless UE device that comprises one or more of the following features: a processor configured to control at least one of a plurality of subsystems to scan multiple radio frequency spectra for detecting sensory data associated with multiple radio channels relative to at least one radio element utilizing multiple radio access technologies in a sensing area of the wireless UE device; the processor further configured to control at least one of the plurality of subsystems to determine if the wireless UE device is out of range of a wide area cellular network; the processor further configured to control at least one of the plurality of subsystems to establish a short-range wireless communication path with another wireless UE device having a wide area cellular communication connection; and the processor further configured to control at least one of the plurality of subsystems to transmit the sensory data to the another wireless UE device for reporting to a network element associated with the wide area cellular network.

Embodiments of systems, methods, apparatuses and associated tangible computer-readable media having instructions and tangible computer program products relating to dynamic coordination of radio resources usage and allocation in a radio network of the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1A, depicted therein is an example radio network environment 100A wherein radio resources may be managed in accordance with an embodiment of the present patent application. It should be recognized that the radio network environment 100A may be comprised of one or more diverse networks deployed by respective operators using any known or heretofore unknown technologies involving radio communications, for example, including but not limited to wide area cellular networks, WiFi networks, Wi-MAX networks, television (TV) broadcast networks, satellite communications networks, and the like. Further, radio frequencies utilized in the diverse technologies may comprise different licensed spectral bands, unlicensed spectral bands, shared or pooled radio frequencies, other lightly licensed bands, fixed TV white space bands (e.g., unused television frequencies between 54-698 MHz), and so on. Furthermore, the radio frequencies operable within the radio network environment 100A may be compatible with Global System for Mobile Communications (GSM) networks, Enhanced Data Rates for GSM Evolution (EDGE) networks, Integrated Digital Enhanced Networks (IDEN), Code Division Multiple Access (CDMA) networks, Universal Mobile Telecommunications System (UMTS) networks, any 2nd- 2.5- 3rd- or subsequent Generation networks, Long Term Evolution (LTE) networks (i.e., Enhanced UMTS Terrestrial Radio Access or E-UTRA networks), networks capable of High Speed Downlink Packet Access (HSDPA) or High Speed Uplink Packet Access (HSUPA), or wireless networks employing standards such as Institute of Electrical and Electronics Engineers (IEEE) standards, like IEEE 802.11a/b/g/n standards or other related standards such as HiperLan standard, HiperLan II standard, Wi-MAX standard, OpenAir standard, and Bluetooth standard, as well as any mobile satellite communications technology such as Geo Mobile Radio (GMR)-1, and other satellite-based technologies, e.g., GPS. Accordingly, the radio network environment 100A illustrated in FIG. 1A is envisaged to be a comprehensive environment that can also include other elements such as femto cells and pico cells (that extend coverage to indoor areas, for example), WiFi access points, relay nodes, and the like.

By way of illustration, various coverage areas of the radio network environment 100A are exemplified with one or more network infrastructure elements such as base stations that may be interconnected as well as connected to other network components such as radio network controllers (RNCs), core networks, and other network nodes. Reference numerals 102-1 through 102-5 refer to five example coverage areas each being served by a corresponding base station 104-1 through 104-5. Although the coverage areas 102-1 to 102-5 are shown as distinctly separate areas, they may be overlapped. Also, whereas only one base station is illustrated with respect to a coverage area, there may be additional base stations overlapping the same coverage area that operate in the same or different radio access technologies (RATS). Again by example, base station 104-1 serving the coverage area 102-1 is operable with a suitable radio access technology, e.g., RAT-B. Likewise, base station 104-2 may also operate with RAT-B, whereas base stations 104-3 through 104-5 may operate with RAT-A, RAT-D and RAT-C, respectively. Depending on the radio access technology, a base station may be coupled to an RNC 106 for connecting with an associated core network 108. Where an LTE-based network implementation is involved, the base station functionality as well as the RNC functionality may be integrated in a single radio network element known as evolved Node B (eNB). Additionally, a base station may be provided with peer-to-peer connectivity (e.g., a backhaul link) with other base stations, which may be employed in one embodiment for exchanging sensory data information as well as resource allocation and management/usage messages, as will be described below.

Each coverage area may serve a number of mobile communications devices (which may also be somewhat interchangeably referred to as wireless user equipment (UE) devices, wireless terminals, mobile terminals, mobile stations, white-space devices, etcetera). In a more general representation, a wireless UE device may also comprise any portable computer (e.g., laptops, palmtops, or handheld computing devices) capable of wireless communication or any enhanced personal digital assistant (PDA) device or integrated information appliance capable of email, video mail, Internet access, corporate data access, messaging, calendaring and scheduling, information management, and the like, that may be operable in one or more modes of operation. For example, a UE device may operate in the cellular telephony band frequencies as well as wireless Local Area Network (WLAN) bands, or possibly in the WLAN bands alone. Further, other bands in which the UE device could operate wirelessly may comprise Wi-MAX bands, one or more satellite bands, TV white space bands, etc. As illustrated with respect to the coverage areas of the radio network environment 100A, reference numerals 110-1 through 110-4 refer to the example wireless UE devices that may operate in different coverage areas. Further, some of the UE devices may be provided with the capability to engage in inter-device communications whereby two devices (e.g., MCD 110-3A and MCD 110-3B in coverage area 102-3) may exchange information in peer-to-peer radio links. In some instances, one or more UE devices may communicate using a satellite-based system (e.g., communications satellite 111). As will be described in additional detail below, one or more UE devices may also be configured in an embodiment to operate as a sensing element for detecting various pieces of sensory data in one or more radio channels of the radio network environment 100A.

Network 108 is illustrative of one or more core networks with which the various corresponding radio access networks (including, e.g., the base stations and eNB nodes, etc.) communicate for effectuating communication processes as well as for providing interactivity with other network domains. For instance, one or more mobile switching centers (MSCs), short message service centers (SMSCs), home location/visited location registers, (e.g., HLR/VLR 118), authentication centers (e.g., Authentication, Authorization and Accounting (AAA) node 120), and the like may interoperate as part of or in conjunction with the network 108. In some embodiments, although not specifically shown in FIG. 1A, an IP Multimedia Subsystem (IMS) network and associated functional entities (e.g., Call Session Control Function (CSCF) nodes, network domain selection (NeDS) nodes, and other application servers) may also be interfaced with the network 108. With respect to connectivity to public switched and IP service networks (e.g., the Internet) 114, appropriate gateway nodes (e.g., a Gateway GPRS Support Node or GGSN 116) may also be provided in association with the network 108. Likewise, satellite-based radio communications infrastructure (e.g., satellite ground stations 112 that support and control uplink and downlink communications with communications satellites 111) may also be suitably interfaced with the service network 114.

In accordance with the teachings of the present patent application, various elements of the radio network environment 100A may be used as sensing elements to monitor, determine, detect or otherwise measure radio resource usage and interference conditions at one or more geographic locations within a coverage area of region of a network. Each element of the network may act as a radio condition "sensor" (i.e., a sensing element), which can include existing network elements with sensing capability (e.g., base stations) or standalone sensing elements/modules coupled to the existing network elements. Sensing elements may comprise base stations, mobile/nomadic devices, relays, femto cells, pico cells and other access points in an area of interest and may operate across single or multiple radio access technologies as an overlay sensor network to sense radio conditions in the environment in order to help improve the efficiency and capacity of a mobile communications network. Accordingly, the sensors are configured to measure and report radio resource usage and interference conditions (i.e., sensory data) at various geographical locations and spectrum bands within a coverage area of a network. In one embodiment, the sensory data information may be reported to and consolidated at a channel occupancy and location database (COLD) 122 as shown in FIG. 1A, that can be updated dynamically to provide the elements of the network with a real-time view of the channel usage throughout the network. The COLD database 122 may therefore be suitably interfaced with the network infrastructure (e.g., via appropriate connections to the core network 108, RAN elements such as base stations or eNBs, etc.). Additionally, the COLD database 122 may be coupled to the service network 114 for exchanging radio conditions information with other, possibly third-party, external channel occupancy databases, e.g., ECOD 124, among others.

Figure 1B:
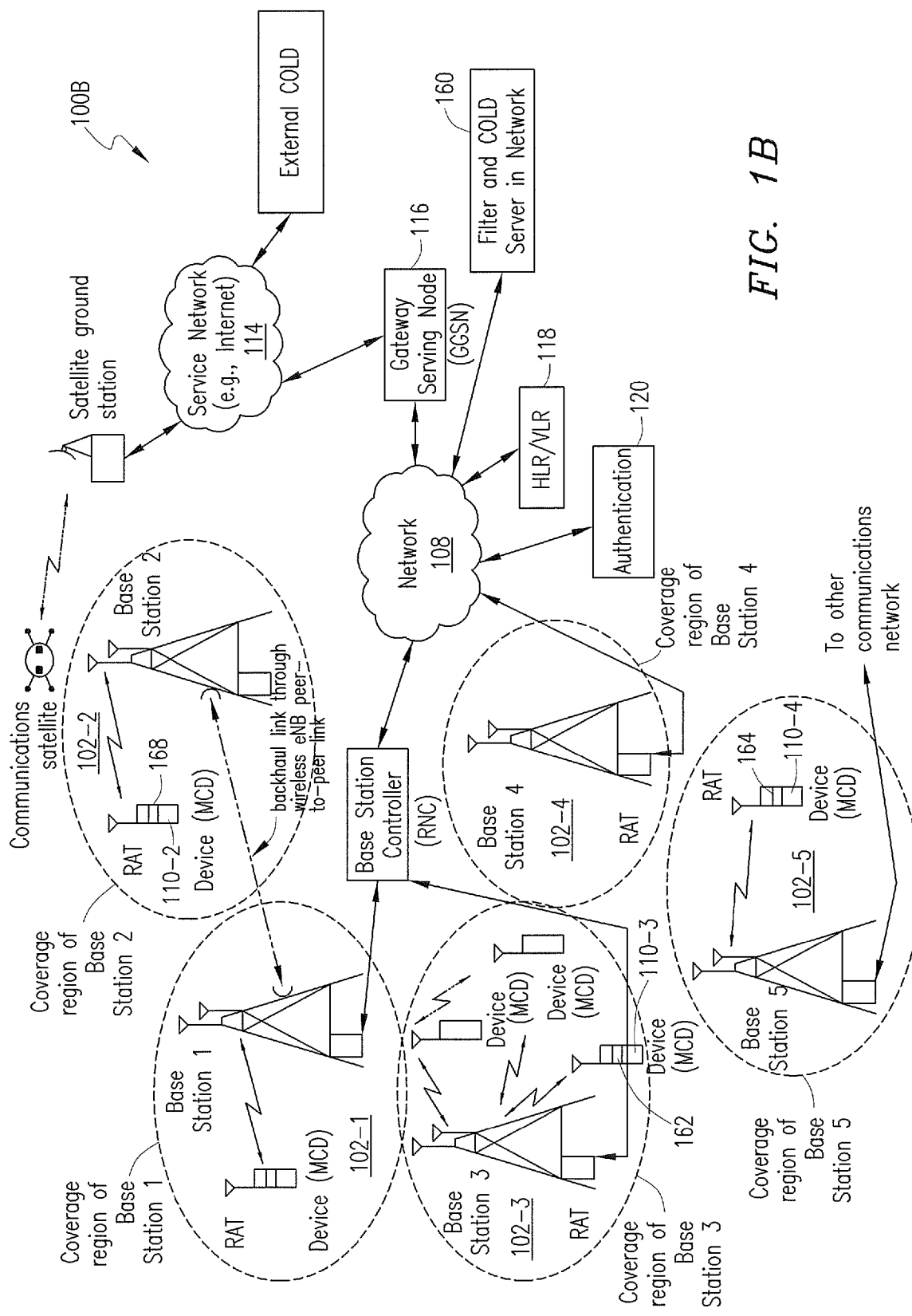
FIG. 1B depicts an example radio network environment where channel occupancy and location database (COLD) information may be deployed at one or more elements of the network environment in a distributed architecture for purposes of the present patent application.

In another embodiment, the radio conditions information (i.e., sensory data) may alternatively or additionally be stored in distributed COLDs at nodes throughout a radio network including, e.g., mobile devices, but not limited thereto. The distributed COLDs share and exchange information in order to disseminate sensing information throughout the network. This configuration may be used to manage mobile communications traffic in the network or for device-to-device communications. One of ordinary skill will recognize that sensor network information may also be used to improve the overall efficiency of the network and its sensors. FIG. 1B depicts an example radio network environment 100B where COLD information may be deployed at one or more elements of the network environment in a distributed architecture for purposes of the present patent application. It should be appreciated that the radio network environment 100B of FIG. 1B is essentially similar to the radio network environment 100A illustrated in FIG. 1A in its representation of the exemplary and comprehensive scope of a radio network environment. Accordingly, the description of FIG. 1A is equally applicable here, mutatis mutandis. However, in accordance with the alternative embodiment of the distributed COLD architecture, the radio network environment 100B includes one or more mobile devices having a COLD database and appropriate sensor/processor logic for effectuating the sensing, reporting and processing of the sensed COLD information in their respective micro radio environments (i.e., a small, localized area, hereinafter referred to as "sensing area", within which a UE device's radio transceiver circuitry can effectively sense the channel conditions prevalent in that area, which is much smaller than a coverage area of a base station due to the UE device's lower operating power conditions). Additionally, a network-located filtering and COLD server functionality 160 may be provided within or in association with the core network infrastructure 108 also. By way of illustration, UE device 110-3C in the coverage area 102-3 of base station 104-3 in FIG. 1B is provided with a local COLD processor/logic element 162. In similar fashion, UE device 110-4 in the coverage area 102-5 and UE device 110-2 in the coverage area of 102-2 are also provided with respective local COLD processor/logic functionalities 164, 168, for sensing, reporting, and processing the sensed local radio conditions. In addition, depending on the enhanced functionalities of a UE device having the COLD processor/logic, the sensing UE device may be configured to manage its own radio resource usage, or schedule a radio resource to another radio element in its vicinity (e.g., another UE device), or generate appropriate messages to a network node adapted to schedule radio resources within a coverage area.

Regardless of where the sensory data is stored or warehoused, the COLD information may be dynamically updated from input messages received from each sensor of the sensor network with its specific location and usage parameters such as, e.g., interference levels and time of observation. As mentioned previously herein, such dynamically-updated information may be combined with channel occupancy information from other external channel occupancy databases (ECODs) that may indicate relatively static channel availability in the spectral bands such as TV white spaces and other lightly licensed or pooled spectral resources. In a distributed architecture, there may be multiple COLD facilities and in some implementations the COLD may be a distributed function among multiple nodes in the network including, or possibly exclusively, the mobile terminals in one specific implementation. The storage of sensory information in the database, and functioning of the COLD server to provide location/channel occupancy information is suited to, but not limited to, applications of shared or pooled spectrum in which multiple systems may utilize the same spectrum assignments involving both licensed and unlicensed spectrum channels. In cases where the spectrum is shared or pooled, there can be multiple interference sources, RATs, and networks operating in the same area and utilizing common radio spectrum resources. Accordingly, the dynamically-updated sensory data (e.g., the interference levels, signal to interference ratios (SIRs), signal to noise ratio (SNR) levels, inter-symbol interference (ISI) delays and associated location information) is useful in such scenarios for facilitating and effectuating a more intelligent resource scheduling by schedulers that can be device-located, network-located, or both. Further, the sensory data information may also be useful to the management of device-to-device session coordination as mentioned previously herein, since such communication may not follow the cellular frequency reuse pattern that is prevalent in radio communications networks. If significant inference is reported in a geographical area on a specific channel, the mobile network can identify and assign other channels that have less interference, or choose to schedule the session in another manner.

In addition, the COLD information can also be used manage and improve efficiency of the sensor network itself. For example, if multiple devices are located very near each other, the COLD sever can choose to request information from a subset or only one of the devices to limit battery use and signaling. As a result, those devices near other sensing elements such as base stations may not be requested to provide sensory information. In some implementations where devices are configured to provide sensory information, the COLD server functionality can specifically signal certain mobile devices to not provide sensory information, or to provide less (or more) information, or to provide decreased (or increased) frequency of the reporting of information in order to better manage the sensory device resources.

In some embodiments, the COLD functionality may make use of information about channel activities in addition to that provided directly by sensing elements. For example, many of the RATs include in their operations and protocols feedback information that communicates the state of the radio channel (e.g., channel state information feedback and channel sounding measures). This information is generally directly used by the radio apparatus to adapt the modulation and coding scheme (MCS) to the current channel condition. In accordance herewith, some sensory elements (such as base stations and mobile devices) may extract the channel condition information from these processes and make it available to the COLD server(s), possibly together with other aspects such as location, time-of-day information, reliability/confidence levels and the granularity of data. For example, local information available to local COLD servers may include details of dynamic channel occupancy such as type of signal, users/devices, and duration and manner of usage (which are illustrative of finer granularity), while high level COLD servers may contain "coarse" information such as whether a channel is active and the loading on that channel (which are illustrative of coarse granularity). It should be appreciated that making such information available through the COLD can improve the overall network channel utilization through better scheduling arrangements.

Using the radio network environments of FIGS. 1A and 1B as an example, UE device 110-3C may be configured to report its location and sensory information about activity and interference on channels as may be requested by the COLD server (e.g., COLD server 122 of FIG. 1A or any network-located server in a distributed environment of FIG. 1B). For instance, the device may be configured to report sensory information autonomously, on request, or periodically or in the event of change (i.e., event-driven or event-triggered) or of a radio condition (e.g., changing a spectrum etc.). In general, each device or element of the network senses the channel directly related to it and reports to the base station, a COLD server, or both. Accordingly, UE device 110-3C may sense interference and channel usage from nearby communication between UE device 110-3A and UE device 110-3B, and the base station or node (e.g., base station 104-3), as well as the signaling from the base station 104-3 to those devices. That is, UE device 110-3C is configured to monitor both the uplink channels (from the devices to the network nodes) as well as the downlink channels (from the network nodes to the devices). Further, UE device 110-3C may also sense the device-to-device communications between UE device 110-3A and UE device 110-3B, as well as transmissions from transmitters (and/or other mobile devices) in base station coverage areas 102-1 and 102-4 because of their proximity to or overlap with the sensory coverage of UE device 110-3C. Likewise, UE device 110-3C may also be provided with the capability to sense and report information on channel usage by UE device 110-4 and base station 104-5 which may belong to another network or a different radio access technology. In some implementations, base stations from several networks may be "consolidated" so that a sensing UE device may be able to sense transmitters from several networks/technologies using a communications channel in a given area. Using the information of location and interference feedback by UE device 110-3C and other sensing elements of the overlay sensor network, the COLD severer(s) can provide information as to scheduling communications on various channels and managing the device-to-device communications.

Based on the foregoing, it should be appreciated that the sensory data (e.g., channel occupancy/location data) may be stored and processed with respect to various parameters of activity of different channels at different locations. Such information, gathered through sensory reports from sensory elements in a sensor network, may be processed with other reports of sensory information, and may be stored in one or more databases, centralized, distributed, or a combination thereof. Such information can be used for radio resource management (RRM) by providing knowledge of channel use and availability, as well as more detailed parameters regarding the use of the channel at a given location. Accordingly, the radio resource allocation for devices using one or more mobile communications networks can be benefited by implementing a system as described herein that includes one or more of the following, inter alia: (i) sensing at the device the activity of radio resources; (ii) storing the sensory information in a database local to the device; (iii) reporting the sensory information to other devices; (iv) receiving sensory and database information from other devices or nodes in the communications network; and (v) processing the information in the database, together with received information to select and assign radio resources for the device for communications.

Figure 2A:
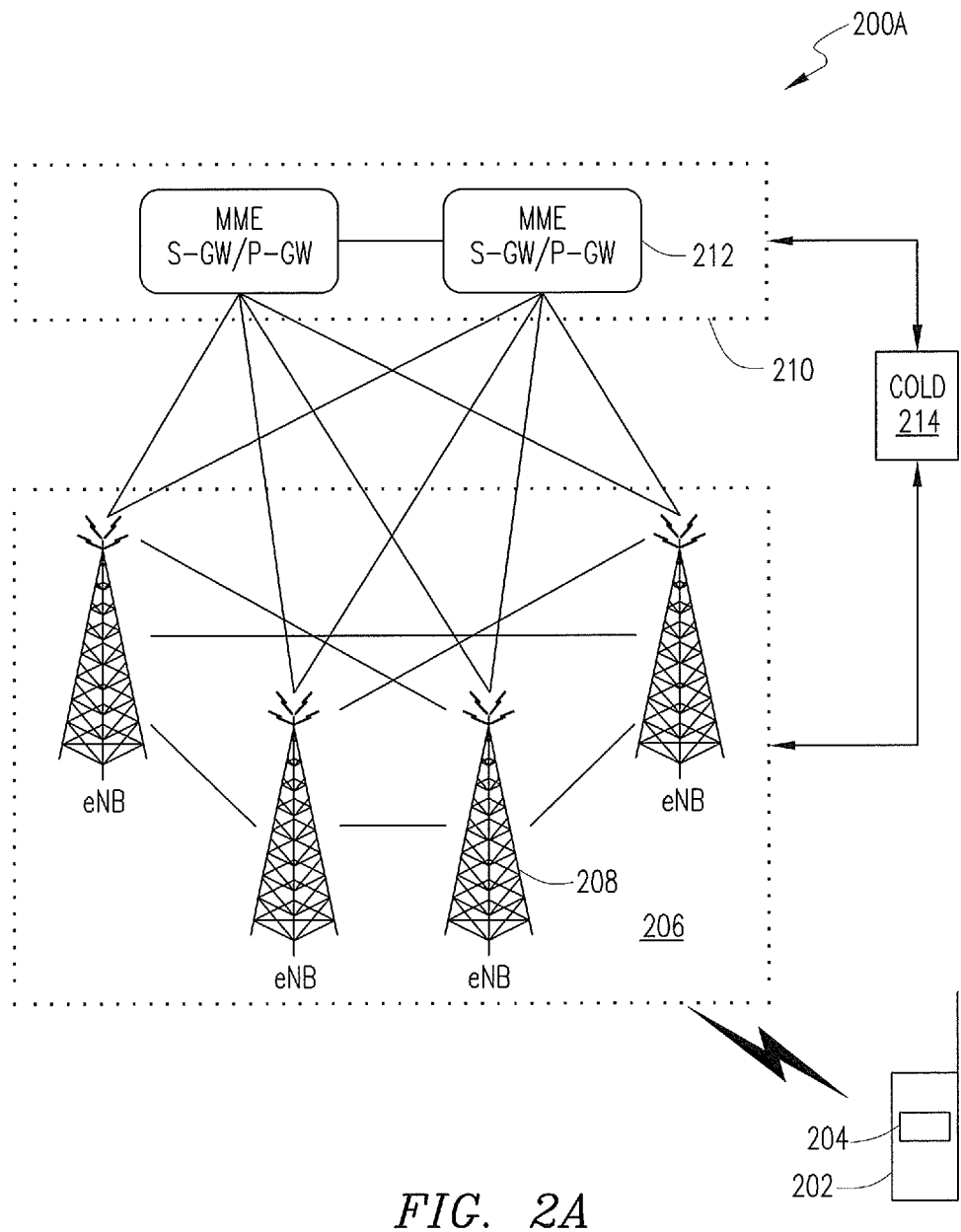
FIG. 2A depicts an example LTE-based radio network having interactivity with a database of sensory data (e.g., channel occupancy and location information) in accordance with an embodiment of the present patent application.

The foregoing teachings and certain aspects relating thereto may be further exemplified within a particular type of network, e.g., an LTE-based network, as set forth immediately below. FIG. 2A depicts an example LTE-based radio network 200A having interactivity with a database 214 of sensory data (e.g., channel occupancy and location information) in accordance with an embodiment of the present patent application. An LTE-compliant UE device 202 is illustrative of one or more mobile devices provided with a sensor processing logic module 204 that facilitates sensory information gathering, reporting and processing with respect to one or more RATs and radio frequency spectra according to one embodiment of the present patent application. An Evolved UTRAN 206 having one or more eNB nodes (of which eNB 208 is an illustrative representation) is operable to serve the UE device 202 with respect to the air interface and RNC functionality. At a higher hierarchical network level is an Evolved Packet Core (EPC) network 210 coupled to E-UTRAN 206, which comprises network entities relating to mobility management, packet data network interfacing as well as interfacing to the E-UTRAN. These functionalities are represented by entities such as a Mobility Management Entity (MME) (which manages mobility, UE identity, and security parameters), a Serving Gateway (S-GW) (a node that terminates the interface towards the RAN), and a Packet Data Network (PDN) Gateway (P-GW) (a node that terminates the interface towards the PDN), collectively illustrated as block 212 in the packet core 210. As illustrated, a sensory database 214 may be disposed in a communication relationship with the elements in E-UTRAN 206, packet core 210, or both. Additionally, the sensory database 214 may also be provided with the capability to engage in a communication relationship with UE device 202.

Figure 2B:
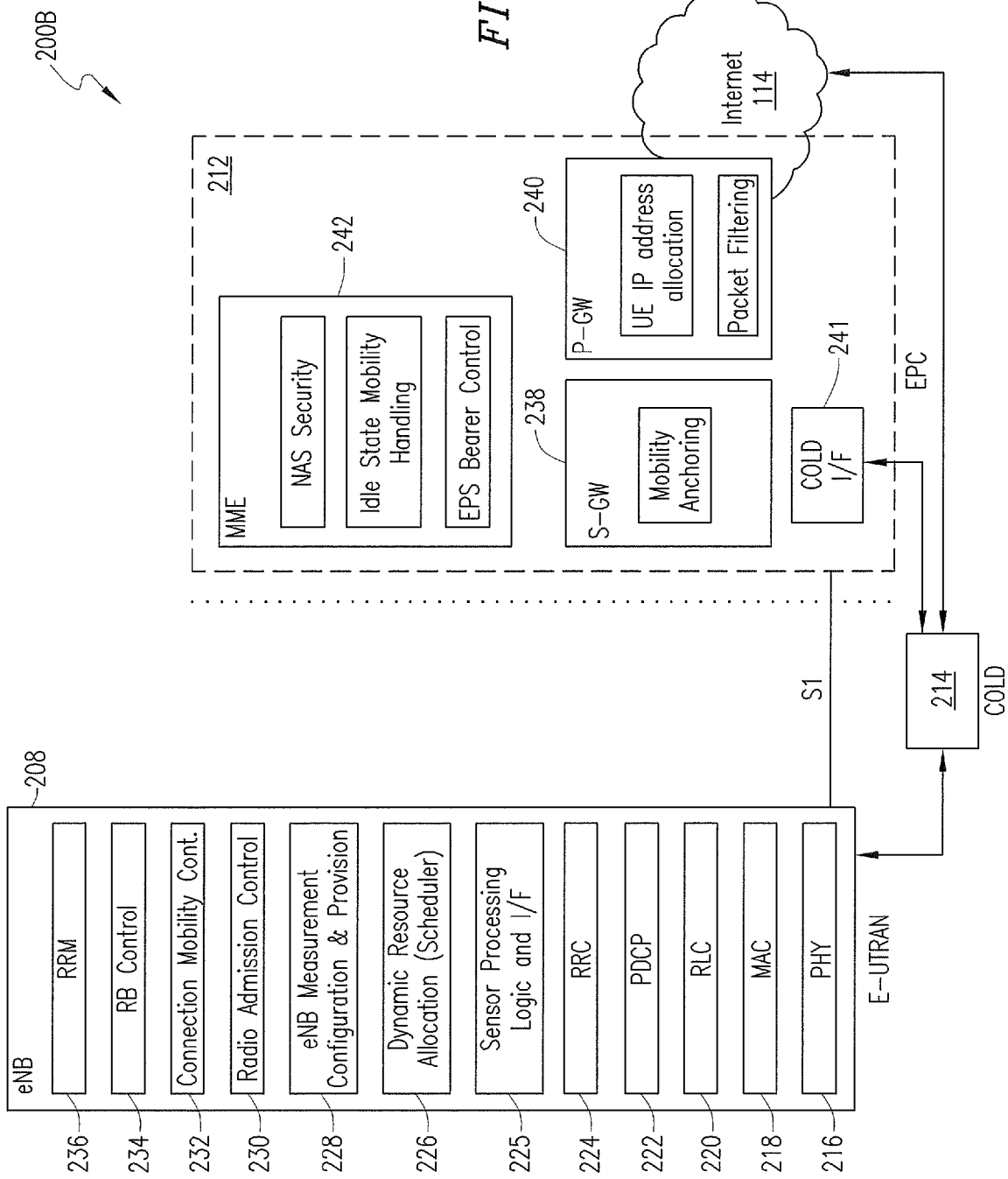
FIG. 2B depicts a diagram of additional details pertaining to the example network of FIG. 2A in one aspect.

FIG. 2B depicts a portion 200B relating to the example network of FIG. 2A in one aspect wherein additional details are illustrated. The exemplary eNB node 208 includes appropriate hardware/software/firmware functionality including, e.g., one or more processors, memory, radio transceiver circuitry, etc. to process the necessary Layer-1 to Layer-3 functions relative to a suitable communications protocol stack that may be effectuated with the UE device on one side and with the EPC elements on the other side. Reference numeral 216 refers to the physical layer (PHY) functionality, reference numeral 218 refers to the Media Access Control (MAC) layer functionality, and reference numeral 220 refers to a Radio Link Control (RLC) layer functionality. A Packet Data Convergence Protocol (PDCP) functionality 222 and a Radio Resource Control (RRC) functionality 224 overlay the lower levels of the communication protocol architecture. Also included in eNB 208 are a dynamic resource allocation (i.e., scheduling) module 226, a measurement, configuration and provision module 228, a radio admission control module 230, a connection mobility control module 232, a radio bearer (RB) control module 234 as well as an inter-cell radio resource management (RRM) module 234 for effectuating the necessary radio interface functions.

Representative EPC network element 212 of the network portion 200B is coupled to eNB node 208 via S1 interface 237. As illustrated in FIG. 2B, the network element 212 includes MME functionality 242, S-GW functionality 238 as well as P-GW functionality 240 that interfaces with an IP network, e.g., the Internet 114. At least part of the hardware/software/firmware functionality of eNB node 208 may be enhanced or otherwise modified to effectuate COLD server processes as well as sensory data processes. For example, sensing channel conditions associated with the eNB node's own radio frequencies as well as the other networks and technologies, generating sensory data requests to other sensing elements (UE devices, other base stations or eNB nodes (via an X2 interface, for example), relay nodes, femto cells, pico cells, WiFi access points, etc.), receiving and processing sensory data inputs from other sensing elements, interfacing with the sensory database 214 for sending reports thereto, and the like, may be effectuated based on the implementation and service requirements. In one embodiment, such sensor processing logic and COLD server functionality may be represented as a functional block 225 provided as part of eNB node 208, which may be configured to send appropriate sensory data messages or processed sensory data messages to the scheduler 226 in order to control or otherwise adjust resource allocation processes after taking into account prevalent channel conditions, occupancy and usage. Where the sensory data is processed elsewhere in the network (e.g., at the COLD server 214, at the EPC node 212 or at some other network element on a different hierarchical level) and is received at eNB 208 via suitable messaging, such messaging may be relayed to the scheduler functionality 226 for resource allocation adjustment. Further, at least part of the EPC node 212 hardware/software/firmware functionality may also be modified or otherwise configured to effectuate suitable sensor data processing logic and interfacing, which may be provided as a separate module 241 in some embodiments, whereby appropriate processes such as COLD server processes, generating sensory data requests to sensing elements, receiving and processing sensory data inputs from sensing elements, interfacing with the sensory database 214 for sending/receiving reports, and the like may be undertaken.

Figure 2C:
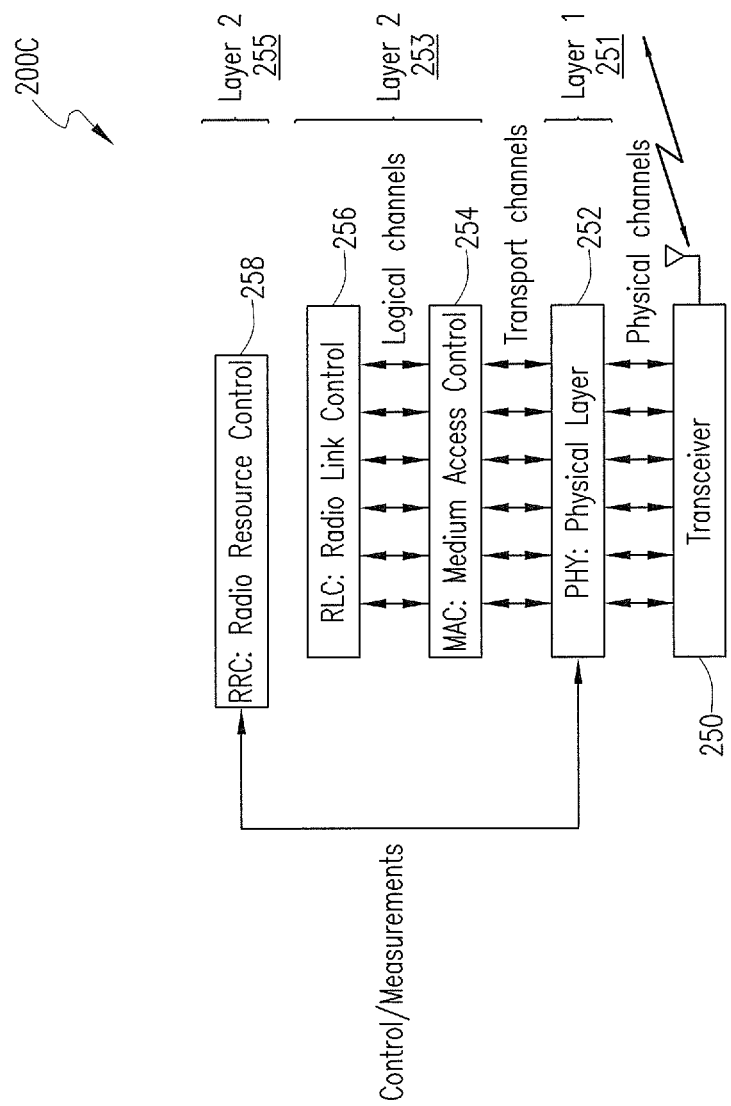
FIG. 2C depicts a diagram of a protocol architecture relative to the example network of FIG. 2A.

Both downlink and uplink communications in the LTE network portion 200B may take place in a number of well defined channels that operate at different levels of the protocol stack that may be mapped from one level to the next. As will be set forth below, some of these channels may be suitably modified to carry the sensory data information for purposes of the present patent disclosure. FIG. 2C depicts a diagram of a protocol architecture 200C relative to the example network of FIG. 2A from the perspective of the communication channels. A number of physical channels carry information between the radio apparatus 250 and PHY layer 252 that forms Layer-1 251 of the protocol architecture. With respect to downlink communications, the physical channels comprise: (i) Physical Broadcast Channel (PBCH); (ii) Physical Control Format Indicator Channel (PCFICH); (iii) Physical Downlink Control Channel (PDCCH); (iv) Physical Hybrid ARQ Indicator Channel (PHICH); (v) Physical Downlink Shared Channel (PDSCH); and (vi) Physical Multicast Channel (PMCH). With respect to uplink communications, the physical channels comprise: (i) Physical Uplink Control Channel (PUCCH); (ii) Physical Uplink Shared Channel (PUSCH); and (iii) Physical Random Access Channel (PRACH). A plurality of Physical layer transport channels support information transfer from PHY layer 252 to MAC and higher layers 254. For downlink communications, these channels are: (i) Broadcast Channel (BCH); (ii) Downlink Shared Channel (DL-SCH); (iii) Paging Channel (PCH); and (iv) Multicast Channel (MCH). For uplink communications, the transport channels are: (i) Uplink Shared Channel (UL-SCH) and (ii) Random Access Channel (RACH). In turn, MAC layer 254 offers a plurality of logical channels to an RLC layer 256, which comprise control channels (control-plane information) and traffic channels (user-plane information) for uplink and downlink communications. These control channels comprise: (i) Broadcast Control Channel (BCCH); (ii) Paging Control Channel (PCCH); (iii) Common Control Channel (CCCH); (iv) Multicast Control Channel (MCCH); (v) Dedicated Control Channel (DCCH). The traffic channels comprise: (i) Dedicated Traffic Channel (DTCH) and (ii) Multicast Traffic Channel (MTCH). Both MAC layer 252 and RLC layer 256 form Layer-2 253 functionality of the protocol architecture. At Layer-3 255 is RRC layer 258 that may also communicate with PHY layer 252 for control and measurements relating to the physical channels.

Figure 2D:
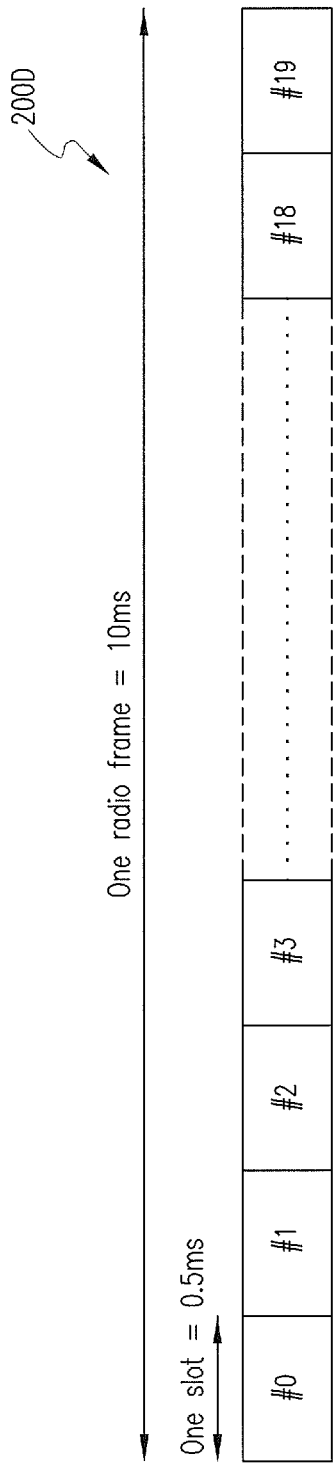
FIGS. 2D and 2E depict example frame structures operable with the network of FIG. 2A.
Figure 2E:
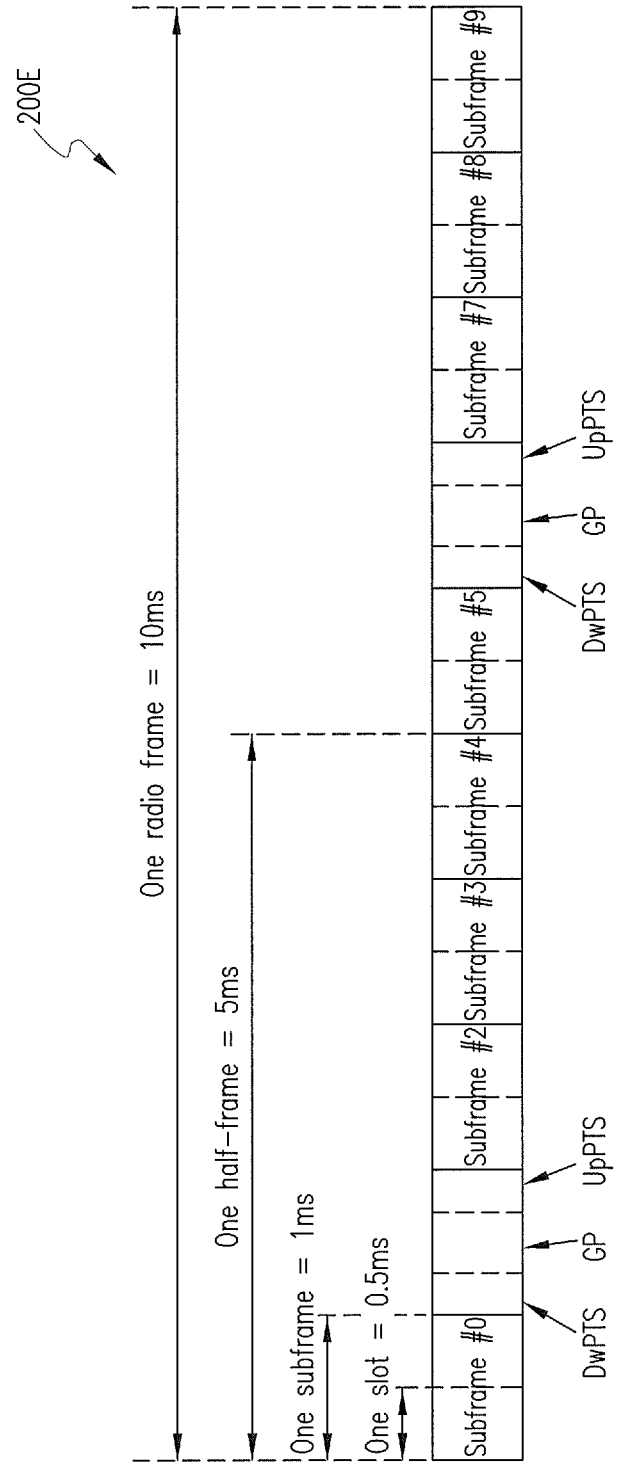

Information may be transmitted in the LTE network portion 200B in two types of radio frame structures: (i) Frequency Division Duplex (FDD) frame structure (also referred to as type 1 structure) and (ii) Time Division Duplex (TDD) frame structure (also referred to as type 2 structure), which define the time-frequency radio resources, i.e., the bandwidth of the carrier (which is divided into several sub-bands or subcarriers) and the time domain (which is divided into time slots) into appropriate radio frames. Typically, a radio frame has a duration of 10 ms, wherein a resource block (RB) spans 12 subcarriers over a slot duration of 0.5 ms. The subcarrier spacing is 15 kHz, thereby giving a bandwidth of 180 kHz per RB. FIGS. 2D and 2E depict example FDD and TDD frame structures 200D and 200E, respectively, operable with the network of FIG. 2A. Each radio frame of 10 ms is comprised of 20 time slots of 0.5 ms, numbered from 0 to 19. For FDD operation, 10 subframes are available for downlink transmission and 10 subframes are available for uplink transmissions in each 10 ms interval. With respect to a TDD frame, special subframes such as Downlink Pilot Timeslot (DwPTS), Guard Period (GP) and Uplink Pilot Timeslot (UpPTS), each having configurable lengths may be interposed in between the subframes carrying information.

The transmitted signal in each slot may be described by a resource grid of subcarriers and symbols as illustrated in FIG. 2F wherein reference numeral 200F is a graphical representation of an array of time-frequency resources. Each element in the resource grid is called a resource element (RE) and is uniquely defined by an index pair (k,l) in a slot (where k and l are the indices in the frequency and time domain, respectively). An exemplary radio frame 260 is divided into 20 time slots, with each time slot (e.g., time slot 262) comprising 7 symbols. The smallest time-frequency unit for transmission, i.e., a resource element, is thus defined as one symbol on one subcarrier. A group of 12 contiguous subcarriers in frequency and one slot in time form a resource block (RB) 264, wherein reference numeral 266 is an illustrative resource element. Data may be allocated to each user/equipment in units of RB and in each time slot, users (i.e., UEs) may be scheduled to one or several subcarriers or sub-bands. In the uplink, when plural sub-bands are scheduled for the same user, the plural sub-bands may be provisioned to be consecutive. Users in adjacent and neighboring cells can be allocated to the same sub-band in the same time slot, and therefore can interfere with each other. Such conditions may therefore be sensed and reported to COLD servers or processors for appropriate scheduling or rescheduling of radio resources in order to minimize, for example, loss in signal strength, bit error rate (BER), block error rate (BLER), etc.

Figure 3:
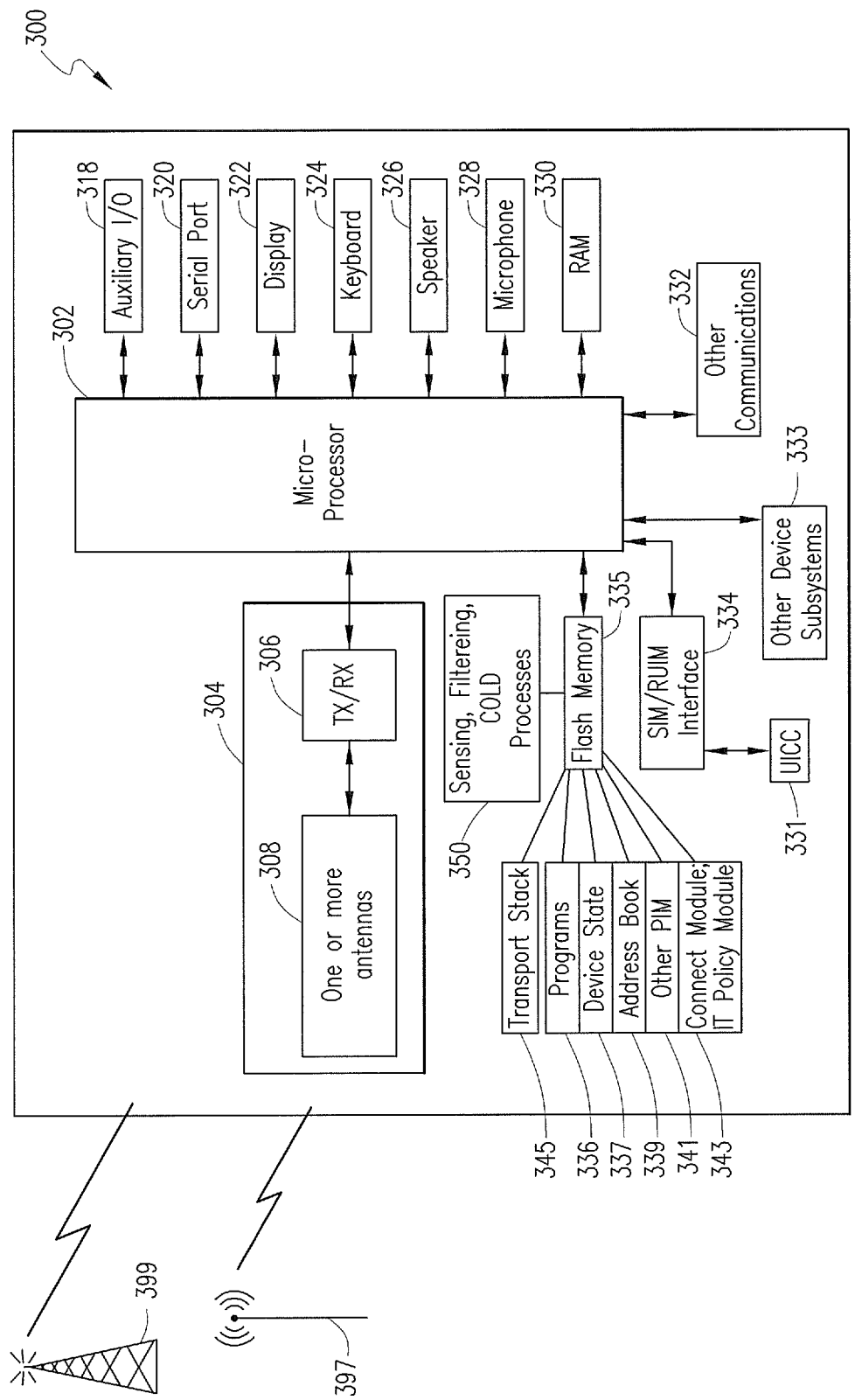
FIG. 3 depicts a block diagram of an example wireless UE device according to one embodiment of the present patent application.

Referring now to FIG. 3, depicted therein is a block diagram of an example wireless UE device 300 according to one embodiment of the present patent application. Wireless UE device 300 may be provided with a communication subsystem 304 that includes an antenna assembly 308 (with one or more antennas), suitable transceiver circuits 306 operable with one or more RATs, as well as additional hardware/software components such as, e.g., signal processors and the like. A microprocessor 302 providing for the overall control of the device 300 is operably coupled to the communication subsystem 304, which can operate with various access technologies, operating bands/frequencies and networks (for example, to effectuate multi-mode communications in voice, data, media, or any combination thereof). As will be apparent to those skilled in the field of communications, the particular design of the communication subsystem/module 304 may be dependent upon the communications network(s) with which the device is intended to operate, e.g., as exemplified by infrastructure elements 399 and 397.

Microprocessor 302 also interfaces with additional device subsystems such as auxiliary input/output (I/O) 318, serial port 320, display 322, keyboard 324, speaker 326, microphone 328, random access memory (RAM) 330, other communications facilities 332, which may include for example a short-range communications subsystem, and any other device subsystems generally labeled as reference numeral 333. Example additional device subsystems may include accelerometers, motion sensors, location sensors, temperature sensors, and the like. To support access as well as authentication and key generation, a SIM/USIM interface 334 (also generalized as a Removable User Identity Module (RUIM) interface) is also provided in communication with the microprocessor 302 and a UICC 331 having suitable SIM/USIM applications.

Operating system software and other system software may be embodied in a persistent storage module 335 (i.e., non-volatile storage subsystem) which may be implemented using Flash memory or another appropriate memory. In one implementation, persistent storage module 335 may be segregated into different areas, e.g., transport stack 345, storage area for computer programs 336, as well as data storage regions such as device state 337, address book 339, other personal information manager (PIM) data 341, and a connect module manager including an IT policy module as well as other data storage areas generally labeled as reference numeral 343. Additionally, the persistent memory may include appropriate software/firmware 350 necessary to effectuate one or more radio channel sensing operations, filtering, report generation and transmission, generation of resource-allocation-related control messages and other COLD-related processes, etc., in conjunction with one or more subsystems set forth herein under control of the microprocessor 302 or specialized circuitry. Powered components may receive power from any power source (not shown in FIG. 3). The power source may be, for example, a battery, but the power source may also include a connection to power source external to wireless UE device 300, such as a charger.

The radio apparatus and associated resources of UE device 300 (i.e., including but not limited to communication subsystem 304) may be extended, configured/reconfigured, or otherwise modified to enable the device to sense (or "sniff") the radio environment without interruption to any ongoing communications processes that may be occurring with the device's serving network station. Such functionality may include sensing during idle times between transmissions to its serving network station (or other stations) and scheduling such transmissions to enable sensing at times needed to detect external signals. Accordingly, the radio apparatus of UE device 300 may sense channel activities and radio conditions in its own RATs as well as other RATs and frequency bands (e.g., TV white spaces, lightly-licensed frequencies, etc.). The radio apparatus as well as any controlling software/firmware may be extended to effectuate measurement of the duration of the signals sensed in a particular radio channel of the radio environment. In a further variation, the radio apparatus and the associated software/firmware may be extended or configured to sense one or more channels substantially at the same time in addition to the channel that the device may be using to communicate with its serving network station. Additionally, the radio apparatus and the associated software/firmware of the device may be extended or configured to include sensing of channels that may be outside the normal set of channels used by the device to communicate with its serving network station. For example, a device that would normally communicate with its serving network station using FDD mode (where the device is normally equipped with a transmitter for one channel in a band to send radio signals to the serving network station (i.e., uplink), and a receiver for another channel in another band for receiving radio signals from the serving network station (i.e., downlink)), the radio apparatus of the device may be extended to include a receiver functionality capable of receiving signals in the uplink band so as to sense the uplink signals sent by other devices that may be nearby. Similarly, if the device is using TDD mode for its radio communications, it may divide its time between uplink transmissions and downlink reception. To facilitate additional sensing, the device may alter the timing of its receiver to enable it to include reception during the uplink intervals in order to sense the transmissions of other devices.

In one arrangement, the sensing functionality of wireless UE device 300 may comprise taking measurements of radio signals including but not limited to the following, inter alia: (i) The signal strength or noise level over bandwidths for the expected signals in the channel(s) being sensed. When there is no identifiable signal in the channel, the sensing process may report the "noise" strength in units such as dBm and the bandwidth. When the signal can be identified, the sensing process would report the "signal" strength in units such as dBm and the bandwidth of the detected signal. (ii) The sensed information, when the signal in the channel can be identified, may include the type of signal (e.g., the radio access technology). The sensing measurements could also include the location of the sensing device, the identification of the stations (network or device) that may be communicating and the identification of the commercial network detected using the channel. (iii) For some radio signal formats, the device may estimate the "loading" of the channel, for example, the fraction of the time that the channel is occupied by radio signals (e.g., IEEE 802.11 packets).

In another variation, UE device 300 may store the sensed information for is own current and future use. Alternatively or additionally, the device may also share the sensed information with other devices or network stations when requested or by subscription (or some other distribution mechanism). Further, the device may receive (and store) sensed information from other devices or network stations (using the radio and network communications links with the serving network station or other devices). This information may be useful to the device (and optionally to other devices of network stations) in evaluating the radio conditions and determining what radio services to use to communicate using the channel currently or at some future time.

Figure 4:
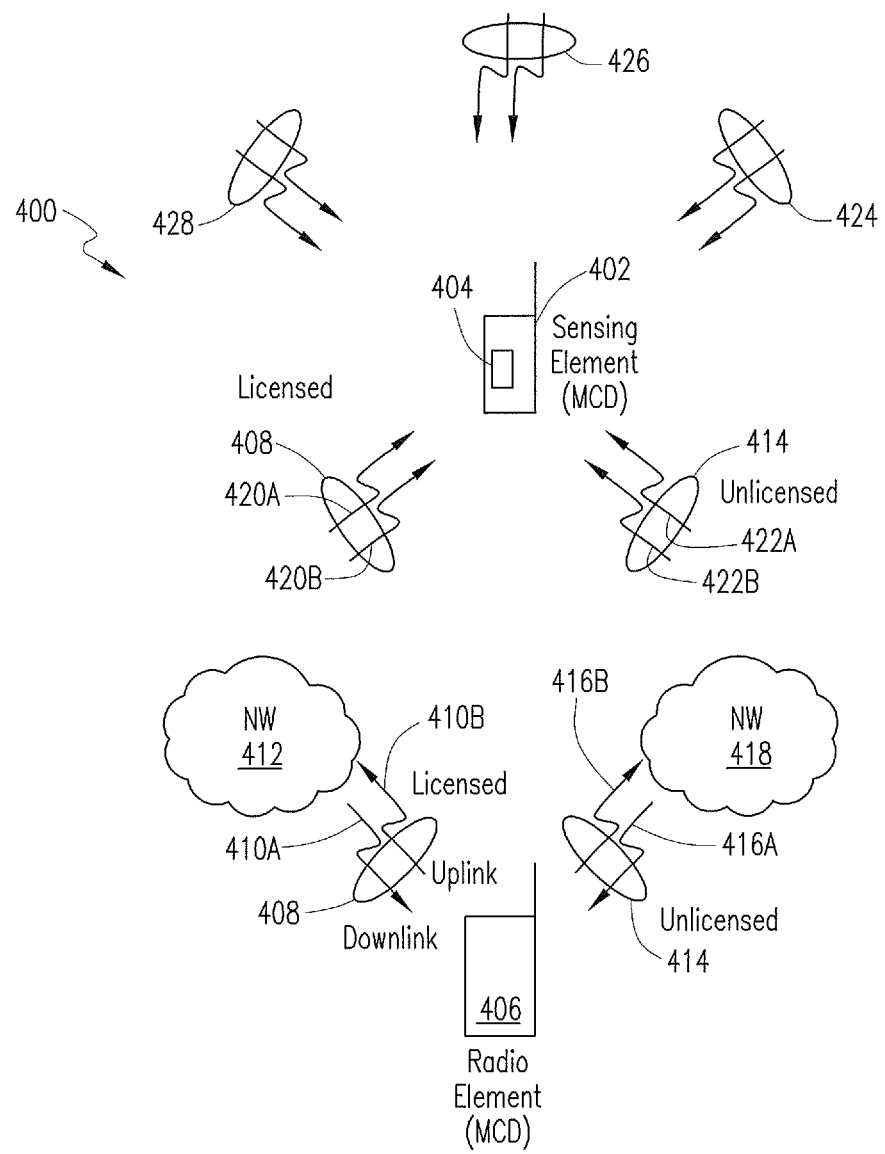
FIG. 4 is an example radio network scenario where a sensing element (e.g., a mobile communications device (MCD) or UE device) may be configured to sense radio resource conditions in both licensed and unlicensed wavelengths according to an embodiment of the present patent application.

FIG. 4 is an example radio network scenario 400 where a sensing element 402 (e.g., a mobile communications device or UE device) may be configured to sense radio resource conditions in both licensed and unlicensed spectra (i.e., bands, wavelengths or frequencies) according to an embodiment of the present patent application. Sensing element 402 is provided with a radio sensing/reporting apparatus 404 that in one embodiment may comprise one or more of the functionalities described hereinabove. A portion of the radio environment that the sensing element 302 is capable of sensing in its location or area (i.e., the sensory region) may be populated at any one time by one or more radio elements such as, e.g., other wireless UE devices operating in the same or different RATs, base stations, and the like. By way of illustration, radio element 406 is exemplary of such a radio element in a non-limiting way that can communicate with one or more networks using licensed, unlicensed, lightly-licensed, or shared/pooled radio resources. For example, radio element 406 may interact with network 412 using licensed resources 408 for its downlink 410A and uplink 410B communications. Likewise, radio element 406 may also interact with network 418 using non-licensed resources 414 for both downlink 416A and uplink 416B communications. Alternatively or additionally, radio element 406 may use appropriate radio resources for communicating with other devices (i.e., peer communications). The radio sensing apparatus 404 of sensing element 402 is configured to scan at least a portion of the RF spectrum to sense radio channels with respect to all such communications as well as any unoccupied channels. As illustrated, reference numerals 420A and 420B refer to the sensory signals received by sensing element 402 with respect to the downlink and uplink channel usage of radio element 406 in licensed communications with network 412. In similar fashion, reference numerals 422A and 422B refer to the sensory signals received by sensing element 402 relative to the downlink and uplink channel usage of radio element 406 in unlicensed communications with network 418. Reference numerals 424, 426 and 428 are illustrative of sensory signals in other RF spectra received by the sensing apparatus 404 of sensing element 402 that may be processed, reported, or otherwise managed for purposes of the present patent application.

Figure 5A:
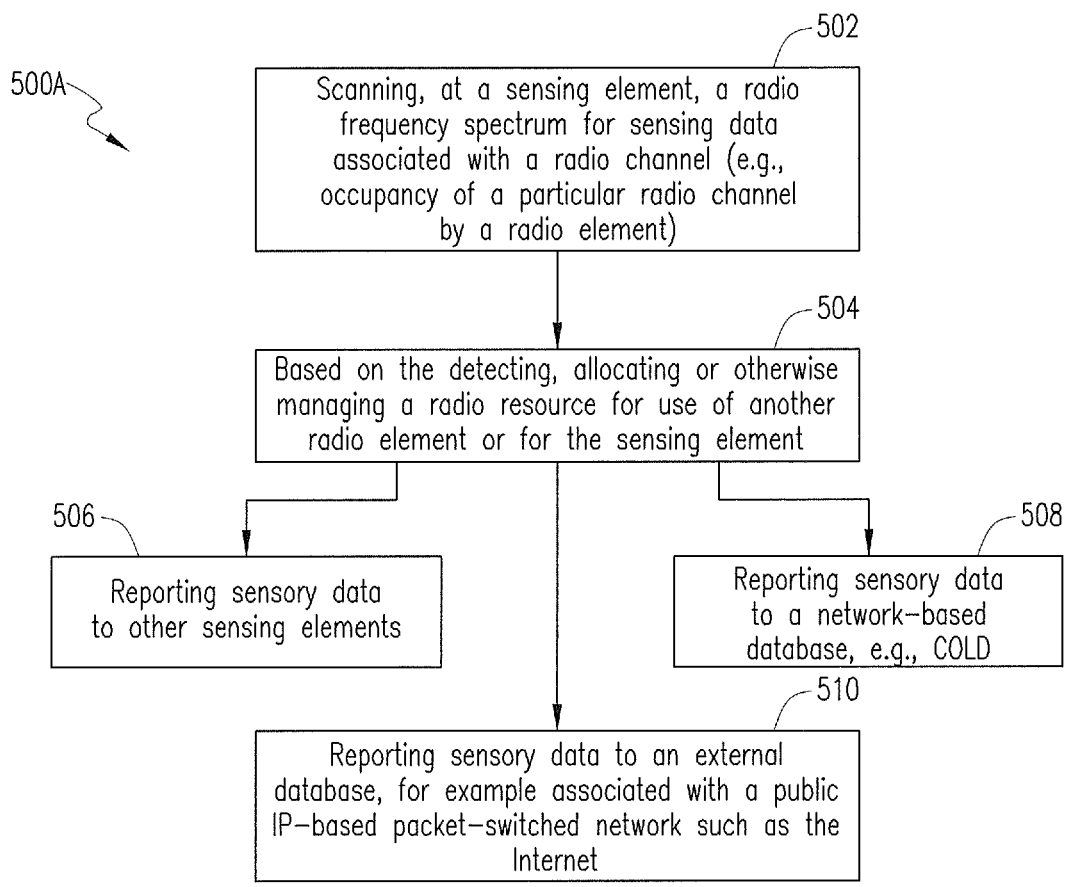
FIGS. 5A and 5B are flowcharts of embodiments of a radio resource management, usage and allocation scheme of the present disclosure.
Figure 5B:
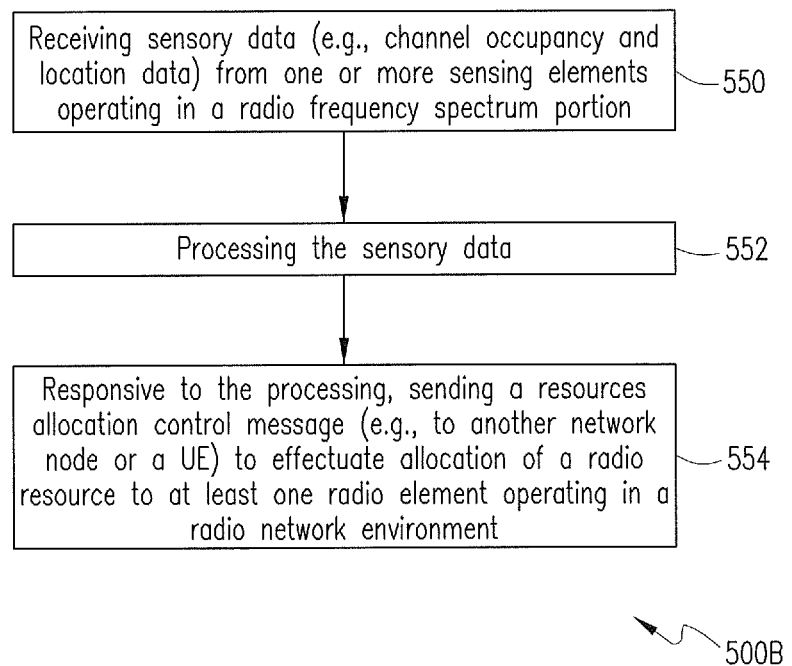

FIGS. 5A and 5B are flowcharts of embodiments of a radio resource management, usage and allocation scheme of the present disclosure. As set forth in block 502 of embodiment 500A, a sensing element scans an RF spectrum for sensing data associated with a particular radio channel (e.g., occupancy of the channel by a radio element, noise/interference characteristics, reliability of the sensed data, etc.). As described previously, the sensing element may be a wireless UE device, a base station or eNB, a serving network node, a relay node, a femto cell, an access point, and the like. Based on the detected sensory data, a radio resource may be allocated, assigned or reassigned, or otherwise managed for the sensing element's own use or of another radio element, which can be another sensing element (block 504). Additionally or alternatively, the detected sensory data may be reported to other sensing elements (block 506). In another alternative or additional arrangement, the sensory data may be reported to an external database, e.g., a database or server associated with a wide area IP network such as the Internet (block 510). In a still further arrangement, the sensory database may be reported to a service network, e.g., a COLD server (block 508).

As illustrated in FIG. 5B, embodiment 500B involves receiving sensory data from one or more sensing elements operating in one or more portions of the RF spectrum (block 550). The received sensory data may be processed, e.g., calculation of interferences, correlation/comparison/combining of expected/projected channel occupancies and durations thereof, application of thresholds on signal strengths (for instance, pre-assigned thresholds), SIR/SNR measurements, error rates, as well as taking into account data granularity and data reliability indications, etc. (block 552). It should be appreciated that "processing" of sensory data may include these and other functions described below in additional detail may be performed in any combination, order or sequence, for purposes of the present disclosure. Responsive to the processed sensory data, a control message (e.g., a resource allocation control message) may be sent to a network (for instance, a resource scheduler operating at an eNB node) or to a UE device to effectuate allocation of a radio resource to at least one radio element operating in the radio network environment (block 554).

Figure 6A:
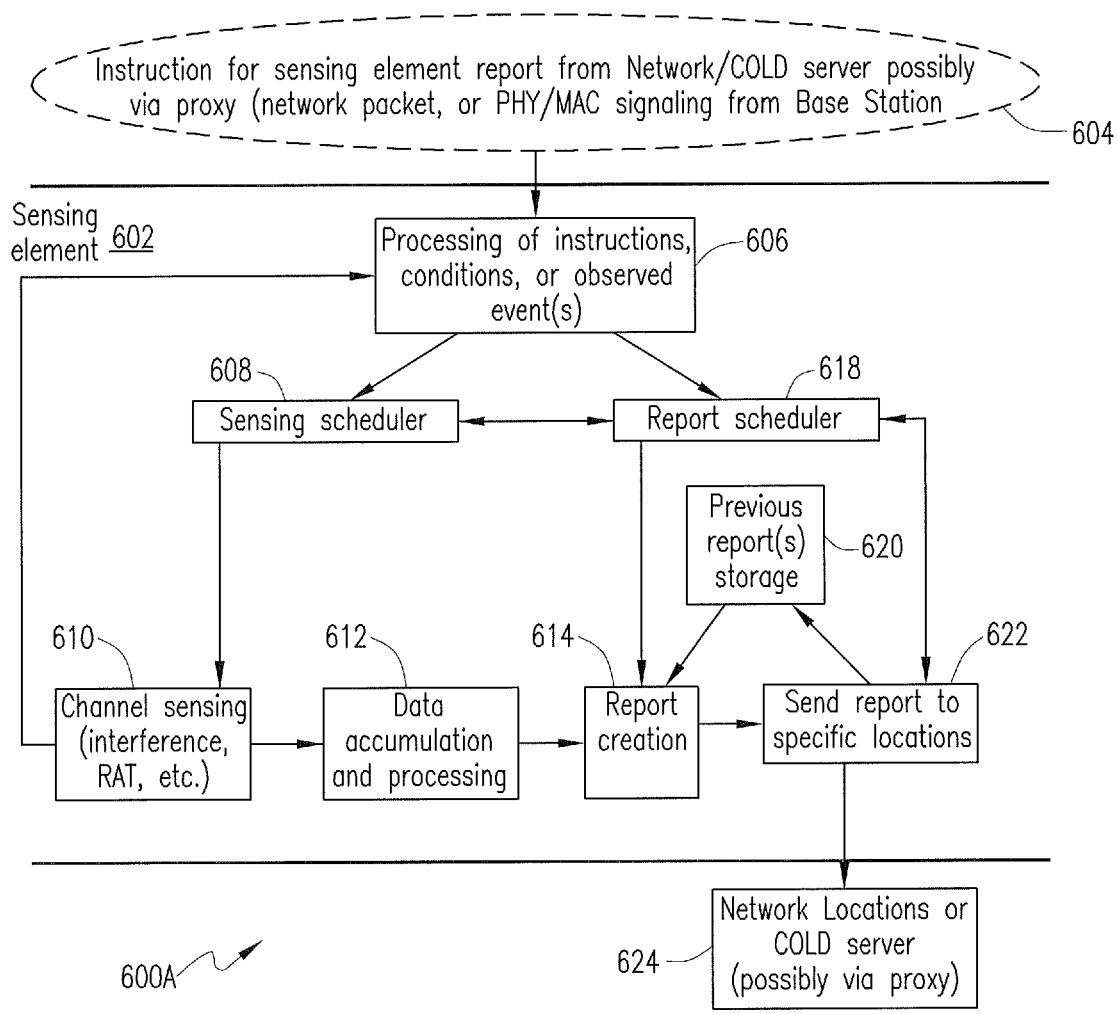
FIG. 6A is a diagrammatic representation of a sensory information acquisition process according to one embodiment.

FIG. 6A is a diagrammatic representation of a sensory information acquisition process 600A according to one embodiment. A sensing element 602 may be provided with the sensory information acquisition functionality which may be implemented as a process executing on one or more control processors of the sensing element (e.g., a UE device or other network elements). In one implementation, the sensing element 602 may be instructed to sense and report sensory data pursuant to instructions signaled from the network/COLD server (block 604). A processing module 606 is operable to process the instructions, sensed radio conditions, or other observed events. A sensing scheduler 608 and a report scheduler 618 may be configured as sub-processes of the overall sensing element process 602 wherein the sensing scheduler 608 is mainly tasked with controlling a channel sensing process block 610. A data accumulator process 612 may locally store and process the sensed data that may be used for report creation (block 614) based on control inputs from the report scheduler 618 as well as based on previous reports obtained from storage 620. Newly created reports or updated reports from previous reports are provided to a transmitter process 622 that may be configured for sending the reports to specific locations based on, e.g., inputs from the report scheduler 618. The reports may be locally stored (block 620) or sent to base stations, network nodes and/or one or more COLD servers 624 (generally referred to as network elements, cumulatively), possibly via a proxy element if the sensing element does not have the necessary connectivity (i.e., out of coverage area).

As set forth previously, a sensor element can be instructed to send back information via instructions signalled from the COLD server, which can be part of the radio communications air interface such as sensor-specific or cell broadcast transmissions, or can be achieved by application-layer signaling (i.e., "over-the-top" or OtT type signaling, e.g., that may utilize TCP/IP or forms of the Short Messaging Service (SMS) or Multimedia Messaging Service (MMS)). The sensor element can also be instructed to report specific information in response to a query message from the COLD server. Further, a request may be configured to initiate a series of report events from the sensor element.

In one embodiment, the sensor element can be configured to sense and report radio environment information autonomously during some specific condition, such as when using a channel with specific characteristics. For example, the sensor element can be configured to communicate sensory information and location information to the COLD server when using spectrum that is shared, pooled, or unlicensed. In another embodiment, the sensing element processes and in particular those associated with the mobile devices may be instructed to report on the interference and usage in select shared channels only. The sensor element may recognize such a requirement of providing the information from a default configuration that is activated when the mobile device is operating in shared channels or by some signaling (such as broadcast messages, or System Information or Master Information Block (SIB/MIB) messages in LTE systems, for example) from the radio communications network such as when instructed to use a particular carrier or band. This signaling may take the form of OtT signaling, an indication in a broadcast message of the cell, or in sensor-specific information.

In an additional embodiment, the sensor element may be triggered to sense and report radio environment information based on a change in conditions. For example, a sensor element may be configured to recognize when the interference level of a communications channel exceeds some threshold. In one implementation, this may be determined by measuring the interference level directly and comparing to a threshold. In an alternative embodiment, a ratio may be measured (e.g., SNR or SIR) and compared to a threshold. A feedback signal may be triggered when the applicable ratio crosses a given threshold. In yet another embodiment, the sensor element may be triggered when the communications channel is degraded beyond a threshold based on one or more performance metrics including but not limited to supportable modulation and coding schemes (MCS), supportable data rate, received signal strength, etc. The sensing process of a sensor element may be configured to be triggered when one or more of above conditions are satisfied such that the sensor element may communicate its sensory data reports to a COLD server. In addition, the sensor element may continue to sense the channel and report only when the conditions change from the last sensing interval or period, or alternately, from the last transmitted report. The conditions for reporting can be configured in the sensor element by broadcast messages signaled by the communications network or can be sent via OtT signaling by the COLD sever.

In some embodiments each sensory data report from the sensing element can contain information of the most recent sensory event (which may be triggered by the initiation of a report itself). In some additional variants of this implementation, the sensory data report may also include information accumulated since the last reporting event or accumulated over some predetermined time window (e.g., a fixed time period or a sliding time window). In a further variation, the information sensed and recorded between reports can be expressed and/or reported as average values over the period for a given metric. Other variants of this implementation may include expressing the sensor information as a log of a series of values, statistical representations of processes observed (including variance, cumulative and probability density distributions, etcetera). In yet another embodiment, the sensing cycles and reporting cycles may not be aligned. For example, the sensing may occur opportunistically at irregular intervals (as may be scheduled by the sensing scheduler 608), while reporting can occur when determined by a regular schedule (based on the reporting scheduler 618).

In some implementations, the mechanism for initiating sensing events may be based on one or more of the following features. (i) When a channel measurement is made or becomes available: For example, channel quality indication (CQI) feedback may be sent as part of regular operation in a cellular system such as Wi-MAX, LTE etc. At every interval, or alternatively, every $n^{th}$ interval as configured, a sensing operation may be configured to coincide with the CQI measurements). (ii) Device is or becomes idle: In this embodiment, sensing is only performed at intervals when the device is not sending or receiving traffic. (iii) Change in radio resource allocation to different carrier, band, or licensing/administrative region: For example, sensing operations may be configured to coincide with one or more of changing from GSM to a 3G connection, or 3G to IEEE 802.11a/b/g, or changing from 2.4 GHz band to 5 GHz band in IEEE 802.11 operation). (iv) A reporting event occurring: In this implementation, a sensing event is initiated each time a report event occurs. For example, a report event may be scheduled every 10 seconds. After each time a report is sent, the sensing event begins. The duration of the sensing event and time needed for processing of the information may be configured to fit in the report interval. (v) Periodic time interval: For example, a sensing event is regularly scheduled to occur every "x" seconds. In some variations, the sensing events may only be completed if the device is a specified mode, for example, an active mode.

In similar fashion, reporting events may be initiated based on one or more of the following features. (i) Sensing event occurred: In this implementation, a report event is initiated at the end of a sensing event. In further variations of this implementation, the report may include information accumulated over multiple sensing events. (ii) Change in sensed data: In this variation a reporting event is initiated when channel conditions change beyond a configured threshold as illustrated by examples set forth previously. (iii) Periodic time interval: For example, a reporting event is regularly scheduled to occur every "y" seconds. In some implementations, the reporting events will only be completed if the device is in a specified mode, for example, an active mode. (iv) Device is idle: In this variation, reporting is only performed at intervals when the device is not sending or receiving traffic. (v) Transmitting other information to network or base station: In this aspect, reporting is initiated to be transmitted with other information being sent via the uplink. In an additional variant, a timer may be introduced to specify an interval over which the device does not send a report unless other information is sent on the uplink. If other information is sent by the device on the uplink during the interval, the report is sent with the other information and the timer is reset.

As mentioned previously herein, the information sensed and reported from the sensing element or device may include the location of the device, time of detection, range of spectrum and strength of the signals, among others. The time of detection may allow the COLD server to identify whether the reports of interference from sensing elements belong to the same interference burst or the same interference sources. In some implementations the mobile device need not do sensing or detection separately from its normal operation. For example, the mobile device may regularly conduct the detection of channel quality, and may simply report this parameter when queried by the COLD server. In one embodiment, the sensing device may be able to, instructed to, and/or configured to identify the signal by type (e.g., noise, TV signal, 802.11, CDMA-IS95, LTE, unidentifiable, etcetera) and/or network type/ID and include such information in the report to the COLD server. As pointed out earlier, the sensing device may also identify the type of RAT(s). Such an operation may be simplified for the device if the detected signal is a RAT supported by the sensing device. The sensing device may therefore additionally identify the signal as originally from its own radio communications network (i.e., the network to which the UE device is currently reporting) or a different radio communications network. Other information may also be requested (and/or reported) in the sensory data report including the bandwidth and/or center frequency of the signals detected. For example, a 3G/2G device using Network A can be instructed to report 2G/3G base stations sensed in the area, the network(s) they are identified with, received signal strength indicator (RSSI) and the bands on which they are transmitting any broadcasting access information. The sensory data reports may also include details regarding broadcast information (available from MIB and/or SIB messages in an LTE network implementation, for example, or similar broadcast channels) such as active primary and secondary carriers. Further, the sensing device may be configured to report interference on bands that exceed a threshold on energy level, or where the base station or transmitter cannot be properly identified. In some cases to limit the volume of reporting, some sensing devices may be configured to exclude the RAT or signal type information from the sensory reports. In other cases, only the interference level in the band(s) may be reported. Optionally, the bandwidth and nature of the time duration of the interference (e.g. 1 ms burst, continuous, bursty with 50% duty cycle, etcetera) may also be reported depending on the sensing device's capabilities and/or the inquiry messages from a COLD server.

In general a sensory data report may include one or more of the following items, or any combination thereof: (i) device location; (ii) time stamp, or alternatively, report number; (iii) interference level; (iv) interference signal bandwidth; (v) band and/or channel (which may be a band instructed in the report request); (vi) center frequency of signal; (vii) signal type (TV, noise, cellular, etcetera); (viii) mobile communications RAT(s); (ix) network/system identification; (x) transmitter station identification; (xi) duty cycle of signal; (xii) expected duration; (xiii) location of receivers (which may include mobile devices); (xiv) sensor identification or authentication; and the like. Additionally, the sensing element may also sense and/or report further parameters of the interference including: (i) FDD or TDD operation; (ii) TDD UL/DL partition ratio and/or timing, etc.

In one aspect, the sensory data information may be gathered from sensing of activity of the signal where determining the sources or the type of signaling (including, e.g., modulation method, multi-user or single-user sources, etc.) at different times in the observed frame may indicate FDD or TDD operation, and if TDD, the partition ratio. In another embodiment, such information may be gathered at the sensing device by acquisition, detection or decoding of a broadcast channel (such as MIB and/or SIB's in LTE systems) or some other signaling that indicates the system parameters. In a further variation, the sensing element may be configured to estimate for how long the interference measured is expected to be valid (i.e., valid duration). Such information can be useful in processing reports by including only reports that are valid (i.e., within their valid duration), and decaying of the weighting factor user in combining multiple reports conditional on the age of the report. In one variation of the embodiment, the sensing element may observe the duration of channel occupancy over a longer window (which may be several frames). For example, the sensing element may estimate that the traffic is due to bursty users by observation over a longer window, and indicate the valid duration of the interference report as relatively short-term. In another variation, the sensing element infers the valid duration of the information from the identification of the source or source type. For example, in another location, a sensing element may observe a type of traffic that is expected to be in use longer-term such as a TV station.

In some additional embodiments, the sensing element report may also include location of receivers, where the sensing element may identify receivers through signaling or be aware of the receiver(s) from direct communications or broadcast communication. If available, the report can contain parameters (band, bandwidth, type, etc.) of the signal the receiver is intended to receive. For example, if a reporting device is engaged in device-to-device communications, it may report details of the other device as well so that the database is aware of both transmitter and adjacent locations which are to be protected from interference. In some embodiments, the sensor or sending element may also include its own identity so that the origin of the report may be traced and calibrated. For example, the sensing element may indicate its unique ID in the report. In another embodiment, the sensor identification may be replaced by a method for authentication such as a certificate or pass code which may be represented as a sequence included in the message, usage in the encoding/encryption of the message, or alternatively in the scrambling of the message after encoding. In a variation of this last embodiment, the identification may contain both a portion associated with the device ID, and another portion consisting of certificate or pass code. The two portions may be sent as composite ID through concatenation, or other combining methods. As will be set forth below in further detail, such information from the sensing elements may be used at a COLD server process for authentication, verification and possibly for filtering of sensory data reports before updating any sensory database(s).

In another aspect, the sensory report itself may be expressed as indexed results from a lookup table of possibilities. For example, the interference levels can be quantized so that they can be expressed as an N-bit value. Other table indices can be used to represent the other category values. In some cases, in order to minimize the information transmitted, the fields transmitted may be expressed as a differential (or a "delta") from the last report transmission. In some cases, only those fields that have changed may be included in the report. The report can also contain and index at the beginning of the report to indicate which fields are included in the report. In some implementations, a report of absolute values (i.e., non-differential) can be sent periodically, or on-demand to reduce the effect of propagation of errors due to missed reports. By observing the report number, or tracking the arrival of expected periodic reports, the network and COLD server may also be able to determine when a report was missed.

In another implementation with respect to reporting, the value of one of the fields other than the report type index may be configured to indicate what is represented in the other fields of the report or how the rest of the report is to be interpreted. For example, the report may contain different fields, and even be different lengths for different report types. For a specific report type (e.g., 0001), the field "signal type" may be presented with possible values as follows: 1: TV type 1; 2: TV type 2; 3: Mobile Cellular 802.16; 4: Mobile Cellular LTE; 5: Mobile Cellular IS-95; 6: Mobile Cellular HSDPA; 7:

Mobile Cellular GSM; and 8: Unknown. The fields that comprise the rest of the report may be of a similar or same configuration if values 1-7 are transmitted. However, different field configurations may be present in the report if the example value "8" is indicated.

A sensory data report may also include a reliability indication with respect to any piece of the sensed/reported data, e.g., the interference value or other information. The reliability indication may be provided as a statistical measure of the confidence level that interference has been correctly characterized by the reporting, or alternatively the sensing, mechanism(s). In one implementation, the reliability indication or value may indicate the confidence that the RAT has been correctly identified. In another embodiment, the reliability value may provide an indication that the interference has been correctly identified as a communications signal and not noise. In this embodiment, the reliability value may be a measurement of the interference level. In another embodiment, the reliability value may also indicate the error tolerance in the measurements (for example +/−10%, or location within +/−50 meters, and the like). In yet another embodiment, the reliability indicator(s) included in the report may be based on the channel conditions under which the report was created, including but not limited to: SNR/SIR, error rates, duration of measurement interval, etc., or the equipment and/or method used to make the measurement, or the confidence of the results/measurements. In some embodiments, the database may also use the identity of the sensor as a factor to assess the reliability of the sensing report based on past reports, local phenomena around that sensor, or other information.

Figure 6B:
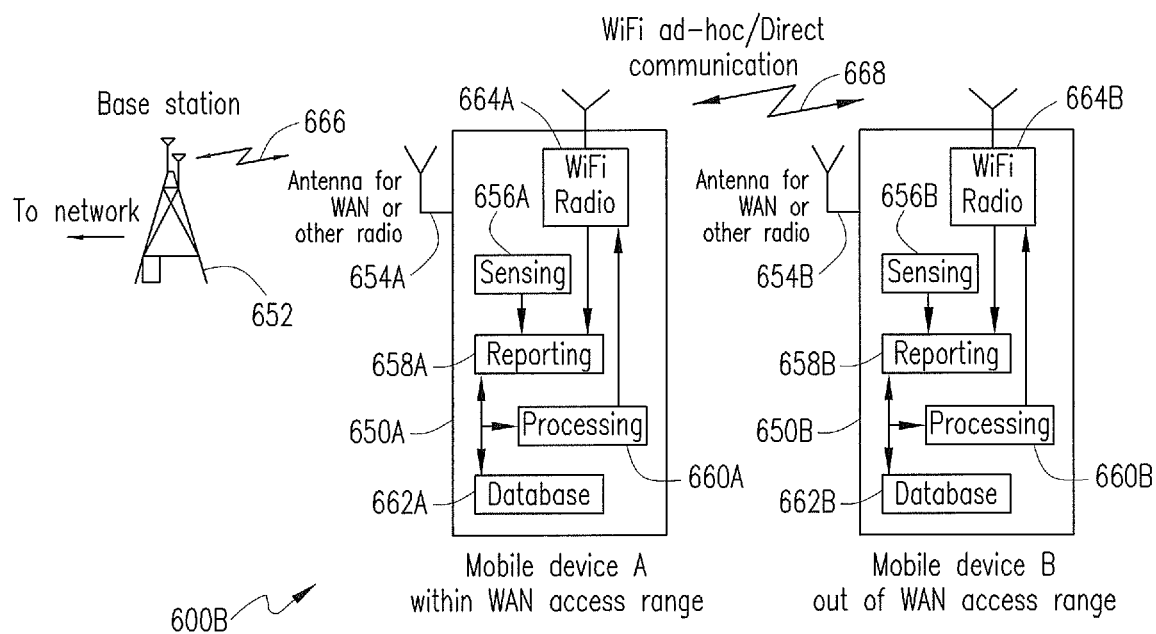
FIG. 6B is an example radio network scenario illustrative of a sensory information reporting process by proxy according to one embodiment of the present patent application.

In some embodiments of a radio network environment, it is possible that not all sensing devices are in contact with the communications network. Some may be able to participate in device-to-device communications and be in range of another device that is connected to the network. In some cases, a device that is not connected to the network can send its sensory information to another device (that in and of itself may or may not have the sensing capability), which can then be forwarded to the communications network and the COLD sever (i.e., proxy reporting). FIG. 6B is an arrangement illustrative of a sensory information reporting process by proxy according to one embodiment 600B of the present patent application. Mobile device 650A is illustrative of a device (e.g., a UE with multi-RAT/multi-channel sensing capability) within a wide area cellular network having connectivity with network infrastructure 652 via a communication path 666. Mobile device 650B is illustrative of a sensing device without such wide area cellular connectivity. It should be realized that either mobile device 650A or mobile device 650B, or both, may be implemented as a wireless UE device 300 described in detail hereinabove. By way of illustration, as exemplary sensing devices, each mobile device comprises respective sensing modules 656A, 656B; reporting modules 658A, 658B; processing modules 660A, 660B; and local database modules 662A, 662B. Each device may also include respective antenna arrangements 654A and 654B with respect to wide area cellular communications or other radio communications. Additionally, each device also includes appropriate WiFi radio apparatus 664A and 664B whereby an ad hoc or direct WiFi communication path 668 (e.g., via device-to-device communications using short-range RF communication) may be established between the devices for sending the sensory data sensed by mobile device 650B that does not have WAN radio access. Accordingly, mobile device 650A acts as a "proxy device" for reporting the sensed data to the network on behalf of mobile device 650B. Furthermore, where mobile device 650B is instructed to provide sensory and location information via signaling, such instructions/messages may be relayed to it via the directly connected device, i.e., mobile device 650A. In one embodiment, when one device (mobile device 650B in FIG. 6B) comes back into suitable WAN/network access range, its own sensing/reporting may take over and the proxy service via WiFi communication with mobile device 650A may be terminated or otherwise superseded. However, as long as mobile device 650A operates as a valid proxy agent for mobile device 650B (i.e., relaying sensing information of mobile device 650B to and from the network), it may aggregate its own sensing information with the sensory data from mobile device 650B before communicating with the network. Likewise, mobile device 650B may also aggregate its own sensory data into batch reports to be sent to mobile device 650A (i.e., batch mode transmission). Such transmissions may be performed responsive to, for example, (i) receiving a request from mobile device 650A or from the network (via device 650A) for the sensory data, (ii) detecting a change in a radio condition in the sensing area of mobile device 650A or 650B, (iii) mobile device 650B commencing operation in a shared radio frequency band, (iv) mobile device 650B changing operation from one radio frequency band to another radio frequency band, (v) passage of an idle period of a predetermined duration, and (vi) passage of a predetermined periodic time duration, and the like.

Based on the foregoing, an exemplary implementation of a method operable with a wireless UE device that requires proxy reporting may be set forth as follows. As described previously, the UE device, although may not have any coverage with respect to a wide area cellular network, is capable of scanning multiple radio frequency spectra for detecting sensory data associated with multiple radio channels relative to at least one radio element in within its sensing area. A determination may be made if the wireless UE device is out of range of a wide area cellular network; and responsive to that determining, a short-range wireless communication path may be established with another wireless UE device having a wide area cellular communication connection. Thereafter, the wireless UE device commences transmitting the sensory data to the other wireless UE device (i.e., proxy) for reporting to a network element associated with the wide area cellular network (e.g., a base station, an eNB node or a COLD server). It should be realized that the software and hardware resources of the wireless UE device (e.g., processors, memory, I/O communications subsystems, etc.) may be adapted as components configured to perform the foregoing acts in accordance with overall processor control.

Figure 7:
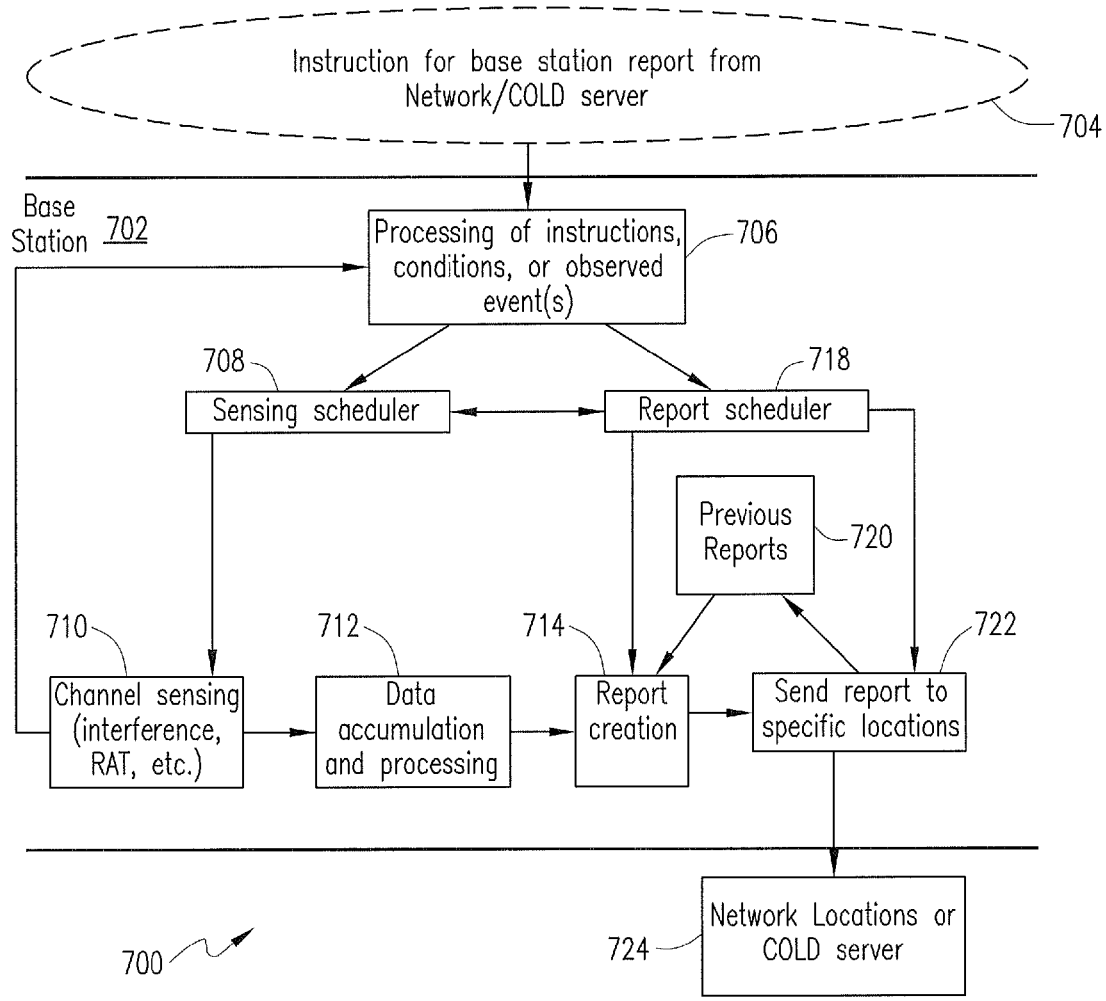
FIG. 7 is a diagrammatic representation of a sensory information acquisition process according to one embodiment wherein a network node (e.g., a base station) is operative as a sensing element.

As pointed out previously, in some embodiments sensory information may also be reported from network element access points such as base stations, eNB nodes, relays, femto cells, sensing stations, etc. that communicate with the radio communications network and the COLD server through wireless and wired connections. For purposes of the present patent application, the term "base station" is used as a general representation for any of such "fixed" sensing elements. FIG. 7 is a diagrammatic representation of a sensory information acquisition process 700 according to one embodiment wherein a network node 702 (e.g., a base station) is operative as a sensing element. In some configurations of the embodiment, the base station may be queried to sense and/or provide reports on radio conditions such as, e.g., channel usage and interference. As illustrated, such querying may emanate from the network or a COLD server (block 704). In other configurations of the embodiment, the base station process may also sense and/or provide scheduled reports to the network or COLD server, and/or be configured in such way that conditions of the channel and/or network may trigger a report or sensing event. In an embodiment similar to the UE device sensing and reporting process described in the foregoing sections, the base station process 702 can report on the channel occupancy and interference levels in one or more bands or spectra. A processing module 706 is operable to process the network/COLD instructions, sensed radio conditions, or other observed events. A sensing scheduler 708 and a report scheduler 718 may be configured as sub-processes of the overall base station process 702 wherein the sensing scheduler 708 may be tasked with controlling a channel sensing process block 710. A data accumulator process 712 may locally store and process the sensed data that may be used for report creation (block 714) based on control inputs from the report scheduler 718 as well as based on previous reports obtained from a storage 720. Newly created reports or updated reports from previous reports are provided to a transmitter process 722 that may be configured for sending the reports to specific locations based on, e.g., inputs from the report scheduler 718. The reports may be locally stored (block 720) or sent to network locations (e.g., other base stations or network nodes tasked with RRM functionalities, etc.) and/or one or more COLD servers, as exemplified in block 724.

As the base station may have more power and equipment resources, the radio apparatus and associated resources may be configured to sense several channels simultaneously or intermittently, and hence may be able to provide at least the level of sensory and channel information as described in the earlier sections relating to the UE device sensing/reporting process. Because of additional processing power, the base station may also be capable of better characterization of the interference in each channel including the type of signal and RAT. In some embodiments, base stations may be configured to detect and report information on RATs that are not supported for access by the base station.

In addition to advanced sensing of channel occupancy and interference, the base station process 702 may also be configured to report its own channel usage or RRM information to the network and/or COLD sever. With this information, the COLD server may be able to correlate the usage information with other sensing/interference reports in order to properly identify and/or confirm the identity of interference sources. In one variation of this embodiment, the base station can report when a different carrier is used (such as, e.g., an LTE carrier). In another embodiment the base station may be configured to report changing the bandwidth of a carrier (such as, e.g., an LTE carrier). In a still further embodiment, the base station or access point may be configured to report changing to a different channel, or even different band (such as, e.g., a WLAN AP changing from 2.4 GHz to a 5 GHz band and channel). In another embodiment, information can be reported to the COLD server wherever and/or whenever the scheduling information is available. For example, the base station can report the assignment of persistent resources to/for a mobile user, or assignment of a frame, slot or carrier as one used for multi-cast broadcast services (MBS). Such information may contain information of future scheduling events and details of the interference expected with respect to any surrounding systems.

Figure 8:
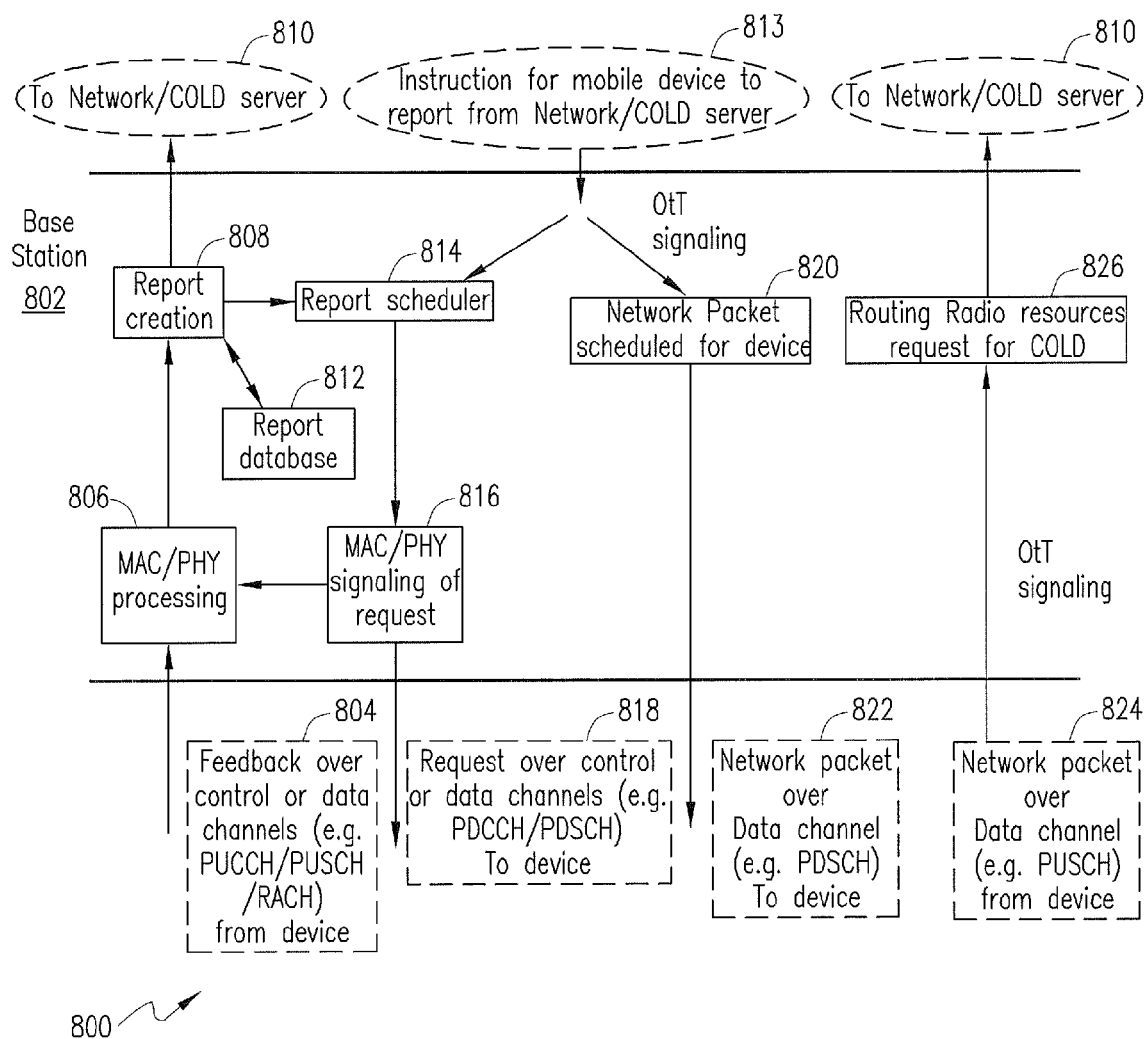
FIG. 8 is a diagrammatic representation illustrative of a network node passing requests for sensing to a UE device according to one embodiment of the present patent application.

In yet another aspect, a base station may be configured to request information, or pass on a request for information to a device in its serving region. FIG. 8 is a diagram illustrative of a process 800 wherein a network node (e.g., base station 802) passes requests for sensing to a UE device according to one embodiment of the present patent application. As illustrated, base station 802 includes one or more sub-processes, modules or functional blocks for effectuating the request handling/passing process 800. A MAC/PHY processing block 806 is operative to process signals received from a UE device over control or data channels such as, e.g., PUSCH, PUSCH or RACH channels in an LTE network (block 804), as well as control signals provided by a MAC/PHY request signaling process block 816 which is operative to send requests to a UE device over control/data channels such as, e.g., PDCCH/PDSCH channels of an LTE network (block 818). The MAC/PHY processing block 806 is configured to provide appropriate information to a report creation block 808 which interfaces with a report database 812 as well as a report scheduler 814. In addition, the base station process 802 may include a packet processing block 820 configured to process packets received from the network, COLD server(s) or other base stations or devices as well as a resource request processing block 826 that is configured to process and route radio resources requests from a UE device towards a network node, COLD server, or other RRM entity (as illustrated in block 810). Some of the foregoing functionalities are set forth in additional detail hereinbelow.

As shown in FIG. 8, the process of requesting reports from a UE device may be initiated in several different ways, e.g., from the network and/or COLD server or base station or another device as exemplified in block 813. The request may be initiated from the network or COLD servers using, for example, OtT signaling. Such a request may be sent in a packet to the UE/mobile device after being scheduled by the base station's RAT. In some embodiments, the request may be initiated from the network or COLD severs and be signalled to the base station to gather sensory information. In some embodiments this process may include the base station signaling of the UE device through either a control channel or an embedded data channel. For example, as mentioned above with respect to an LTE-type system, the request may be indicated by a modified type of physical downlink control channel (PDSCH) or sent in a packet over the physical downlink shared channel (PDSCH) (block 822). Likewise, a resource request or a sensory report from the UE device towards the network or COLD server may be indicated via a modified channel such as a PUSCH channel (block 824). In an alternative embodiment, the base station itself may request the sensing and/or reporting from the UE mobile device and also send the request using suitable control and/or data channels as described above. In a further variation of this embodiment, the base station may initiate the requesting process in order to gain information for a sensing report either requested or scheduled by the network or COLD server.

In some embodiments, a UE device may be configured to report sensory information directly to the base station 802. The sensory information from the UE device is processed by the base station's MAC/PHY processing if received over the uplink control channel or passed in an uplink packet intended for the base station. As mentioned previously with respect to an LTE-type system, the report may be indicated by a modified type of physical uplink control channel (PUCCH), sent in a packet over the physical uplink shared channel (PUSCH), or sent using packets over the random access channels (RACH), as set forth in block 804. The base station 802 can relay the raw sensory information from the UE device directly to the network node or COLD server, or may include additional information from other sensor reports (including reports generated by the base station itself). In generating a report for the COLD server from the UE device report(s), the base station 802 may process some of the information including correlating reports from one or more UE devices, and possibly information from the sensing of the base station itself, in order to determine a more reliable estimation of the channel occupancy and interference data. The base station 802 may also use the reliability estimates from the sensory reports to properly weight the reports when processing (e.g., combining) the information. Such processes may be exemplified in the report creation block 808. In an alternative variation, the UE device may send its sensory report in one or more packets directed towards the COLD server using OtT signaling. In at least this configuration, the sensory reports from the UE device may be in response to, but not limited to, a request sent via OtT signaling.

Figure 9:
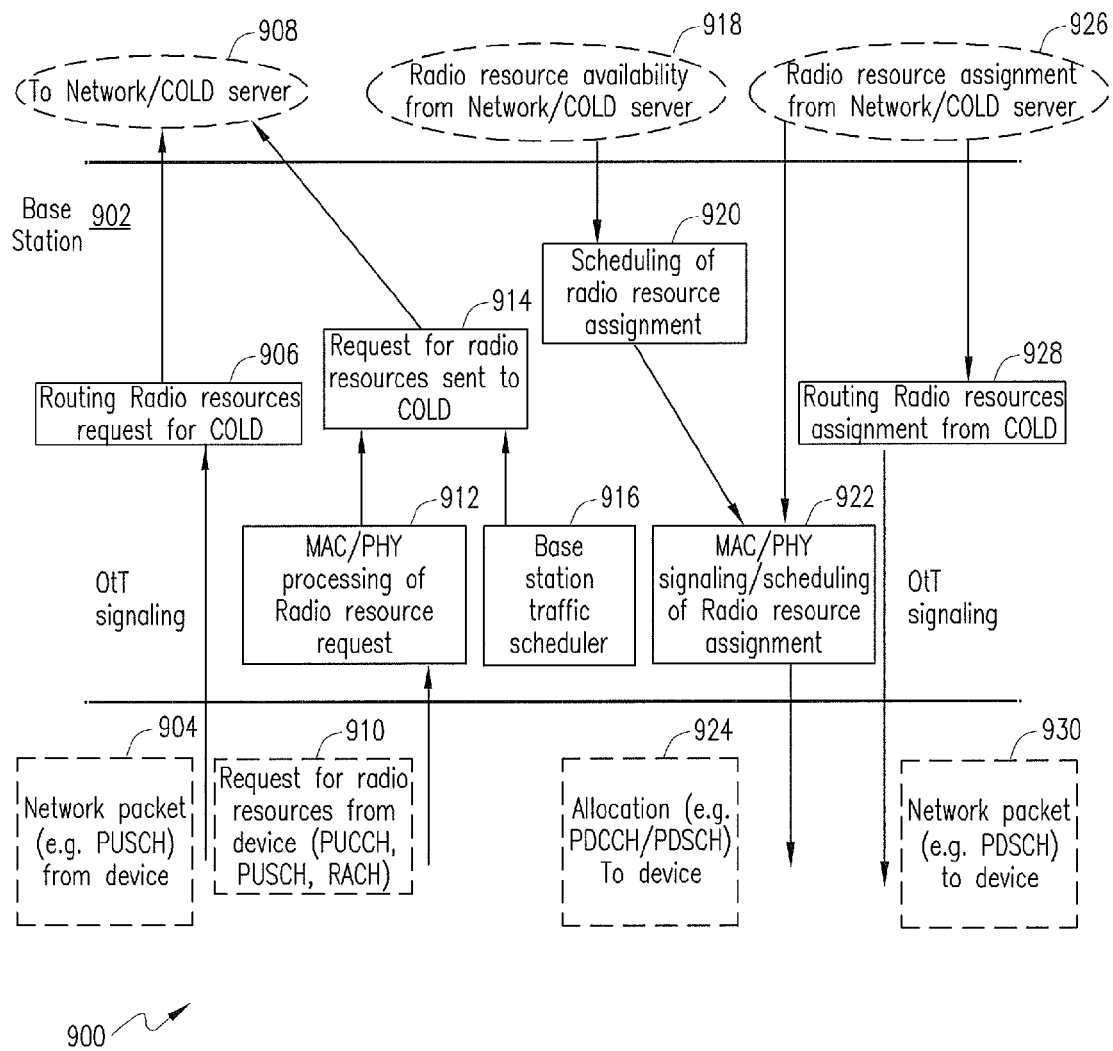
FIG. 9 is a diagrammatic representation that illustrates exchange of commands or messages relative to radio resource allocation in one embodiment.

In another aspect, a base station may also be configured as a point of exchange of radio resource allocation commands and radio resource requests from a COLD server and UE devices, respectively. FIG. 9 is a diagrammatic representation of a process 900 that illustrates exchange of commands or messages at a base station 900 relative to radio resource allocation in one embodiment. Similar to the base station processes described above, base station 902 includes one or more sub-processes, modules or functional blocks for effectuating the overall exchange functionality set forth herein. A radio resource request routing block 906 is operative analogous to the block 826 of FIG. 8 for receiving and processing/routing resource requests emanating from a UE device via OtT signaling (e.g., network packets in uplink channels such as PUSCH channels as illustrated in block 904). A MAC/PHY processing block 912 is operative for processing resource requests emanating from the UE device via modified uplink channels (e.g., PUSCH, PUSCH or RACH channels as illustrated in block 910). A sending block 914 is operable responsive to a base station traffic scheduler 916 in conjunction with the output of MAC/PHY processing block 912 for sending the processed radio resource requests to the network and/or COLD servers, as illustratively exemplified in block 908.

Radio resource availability messages from the network and COLD servers (as exemplified in block 918) are processed for scheduling of radio resource assignment (block 920), which interfaces with a MAC/PHY signaling/scheduling block 922 for transmission of allocation messages to the UE device. As exemplified in block 924, such allocation messages may be effectuated via downlink channels such as modified PDCCH and PDSCH channels to the UE device. Radio resource assignment messaging from the network and/or COLD servers (block 926) may be handled via two mechanisms. In one mechanism, the resource assignment messages may be processed by MAC/PHY signaling/scheduling block 922 for transmission to the UE device as described above. Alternatively, the radio resource assignment messages may be routed by a routing block 928 for transmission to the UE device via OtT signaling (as network packets in a downlink channel such as a PDSCH channel, as exemplified in block 930).

It should be appreciated that although the base station 902 in one embodiment may handle all of its radio resource management functions within a given channel, in some embodiments as described herein the COLD server may be queried for channel suitability, or in a further variation of the embodiment, the COLD server itself may allocate radio resources. Accordingly, in some embodiments the COLD server may be configured to determine available channels based on the sensory information received. In such an implementation, channel availability may be chosen based on characteristics such as, e.g., interfering beyond operating parameters with respect to the operation or coverage of primary users, whether or not certain channels are fully loaded, or otherwise have unacceptable levels of interference or activity, and the like. Additionally, in some embodiments, the COLD server may further consider a "best" channel, e.g., a channel determined as having the least interference, or best performance, or lowest cost that is available.

As described elsewhere herein, requests for radio resource allocations may originate from a UE mobile device (through OtT signaling or through PHY/MAC control and data channels), or from the base station. Such requests may be relayed to the COLD server, and depending on the configuration the COLD server may indicate one or more of: (i) a suggested resource assignment; (ii) available channels; (iii) approval/disapproval of requested resource assignment; (iv) assignment of radio resources; (v) restrictions of radio resource assignment or usage. In one embodiment, the COLD server may be configured to indicate or otherwise suggest a resource assignment based on the request. For instance, the assignment may be based on the requirements specified in the request, such as, e.g., one or more of RAT(s), bandwidth, and/or service request. In an alternative embodiment, the COLD server can provide a list of possible candidate channel assignments that satisfy the requirements set forth in the resource allocation request. In a further variation, the COLD server may be configured to provide a response that approves or disapproves of the request for channel by a UE device. For example, the COLD server may disapprove of a channel assignment request if the channel is "unavailable" or expected to become unavailable for the duration of the requested channel occupancy. In a still further variation, the COLD server may assign a resource assignment based on a request and its requirements, and thereafter update an assignment database so that future assignments to another device do not conflict with the assignments already made or currently active. In another embodiment that may be used in conjunction with other embodiments set forth herein, the COLD server may be configured to provide a message indicating one or more restrictions as to the usage of a particular radio channel. For example, the COLD server may provide restrictions with respect to the range, distance, or other geolocation of the use of the channel. Additionally, alternatively or optionally, the COLD server may also restrict certain transmit parameters of the transmission. For example, in one variation the COLD server may restrict the RAT that a device is to use in a particular channel. In another variation, the COLD server may restrict the maximum transmit power the device can use in the channel. In some embodiments where the resources have been assigned by the COLD server, the base station 902 may communicate the resource assignment to the UE device(s) via control/data signaling channels, OtT signaling, and the like depending on the configuration, as described above. In other embodiments where the response from the COLD server did not include a radio resource assignment (e.g. channel availability, etc.), the base station 902 may be configured to process the information from the COLD server and complete the radio resource assignment as applicable.

Figure 10A:
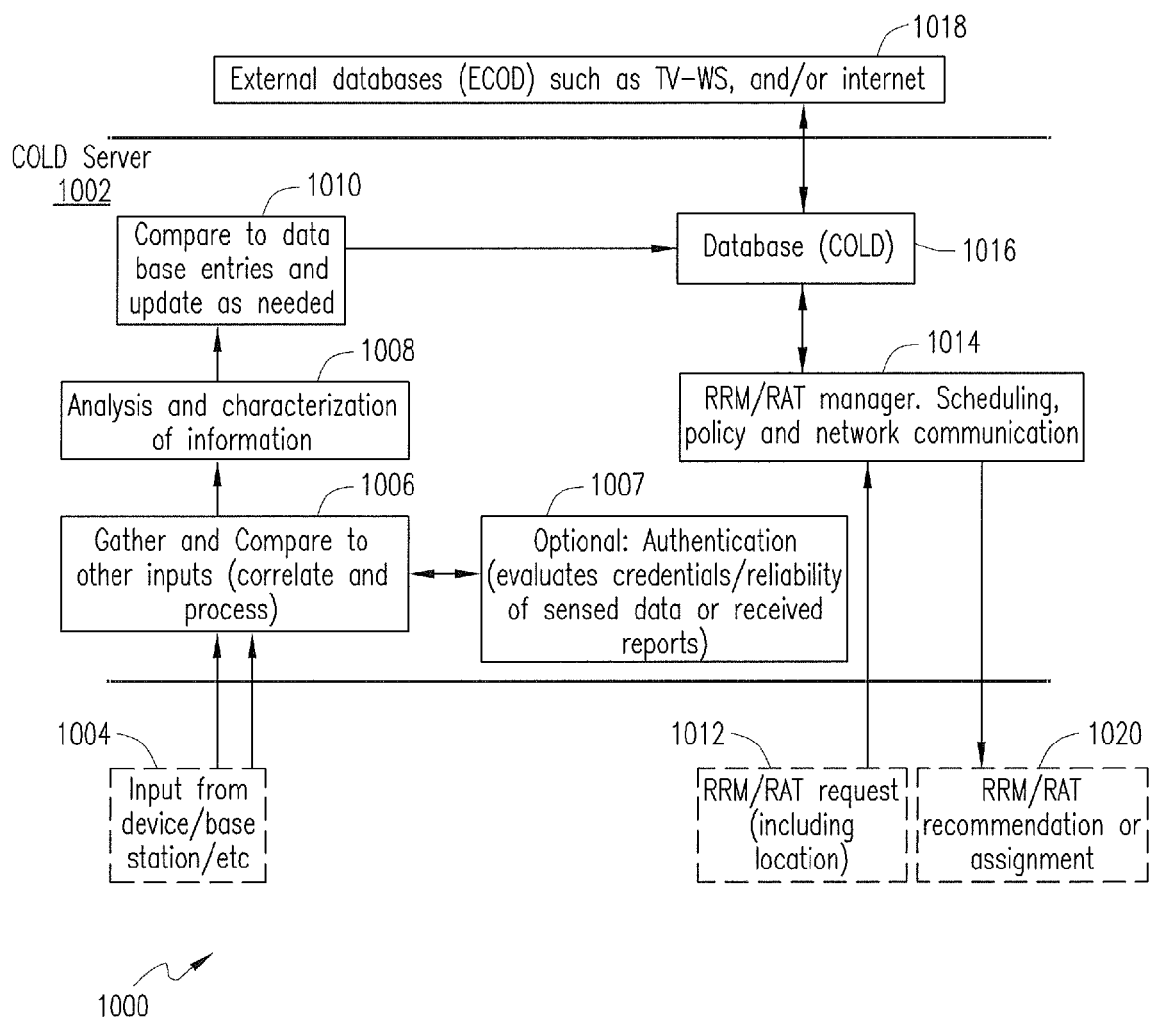
FIGS. 10A and 10B are a diagrammatic representation illustrative of exemplary processes at an embodiment of a COLD server of the present patent application.

FIG. 10A is a diagrammatic representation illustrative of exemplary processes 1000 at an embodiment of a COLD server 1002 of the present patent application for effectuating one or more of the COLD server features described hereinabove. A comparison/correlation sub-process, module or functional block 1006 is operative in response to sensory inputs and other reports from UE devices, base stations, access points, other network nodes, and the like. As an optional implementation, authentication block 1007 may be provided for evaluating credentials and/or reliability of the sensed data and other received reports. Such authentication may be performed as part of or prior to comparing the data and/or reports and performing appropriate correlations as may be warranted. An analysis module or sub-process (block

1008) is provided for analyzing and characterizing the processed data from the comparison/correlation module 1006. An updating module or sub-process (block 1010) compares and updates data as may be needed, which is then provided to a database (block 1016). An entity responsible for RRM, scheduling, assignment and policy (block 1014) is operable responsive to RRM requests (as exemplified in block 1012) and the stored data 1016 for providing suitable RRM recommendations, assignments, etc. to UE devices, base stations, other network nodes, as exemplified in block 1020. Additionally, the database 1016 of COLD server 1002 may be interfaced with external databases such as those associated with a TV white space system, the Internet, and the like, as exemplified in block 1018.

Based on the foregoing, it should be appreciated that the COLD server 1002 in one embodiment may be configured to collect information from various sensory elements of the network to determine regional/local channel occupancy at any given time and to facilitate reducing or otherwise alleviating channel interference and/or congestion by way of one or more appropriate RRM processes. The database 1016 may be configured to contain a map of information indicating the times and locations of channel occupancies, among others. As described elsewhere in the present disclosure, such information may be gathered from sources including network sensor element reports, network activity/channel usage reports, and external information and databases. As to the organization of the database structure, there may be several alternatives that may be combined in different ways depending on implementation. In one embodiment, the database may be organized by sources and receivers of various types, including but not limited to UE devices, access points, microphones, base stations, etc. In this embodiment, each transmitter or receiver known to the database is identified as an entry or record in the database, wherein each entry may contain one or more of the following fields: (i) location; (ii) transmit power; (iii) band/channels of use; (v) signal type (TV, noise, RADAR, cellular RAT, etc.) for each band/channel; (vi) network/system identification; (vii) transmitter station identification; (viii) expected duration; (ix) reliability of reported information; and the like. In another embodiment of the database, the information may be organized based on entries/records for channels and locations. As described previously, the sources/locations of interference may be determined based on the sensory data reports and reporting range of the sensor elements of the network. In a further variation, the entries of the database contain one or more parameters including, for example: (i) channel; (ii) location; (iii) interference level; (iv) signal type or RAT; (v) duty cycle; (vi) source; (vii) reliability of reported information; and the like. In yet another embodiment, a combination of transmitter/receiver databases and channel occupancy databases can be used. Additionally, as mentioned previously herein, the database may be configured to interact with other databases to gather information from external sources so that a local copy of the external information may be made available at the COLD server 1002.

Figure 10B:
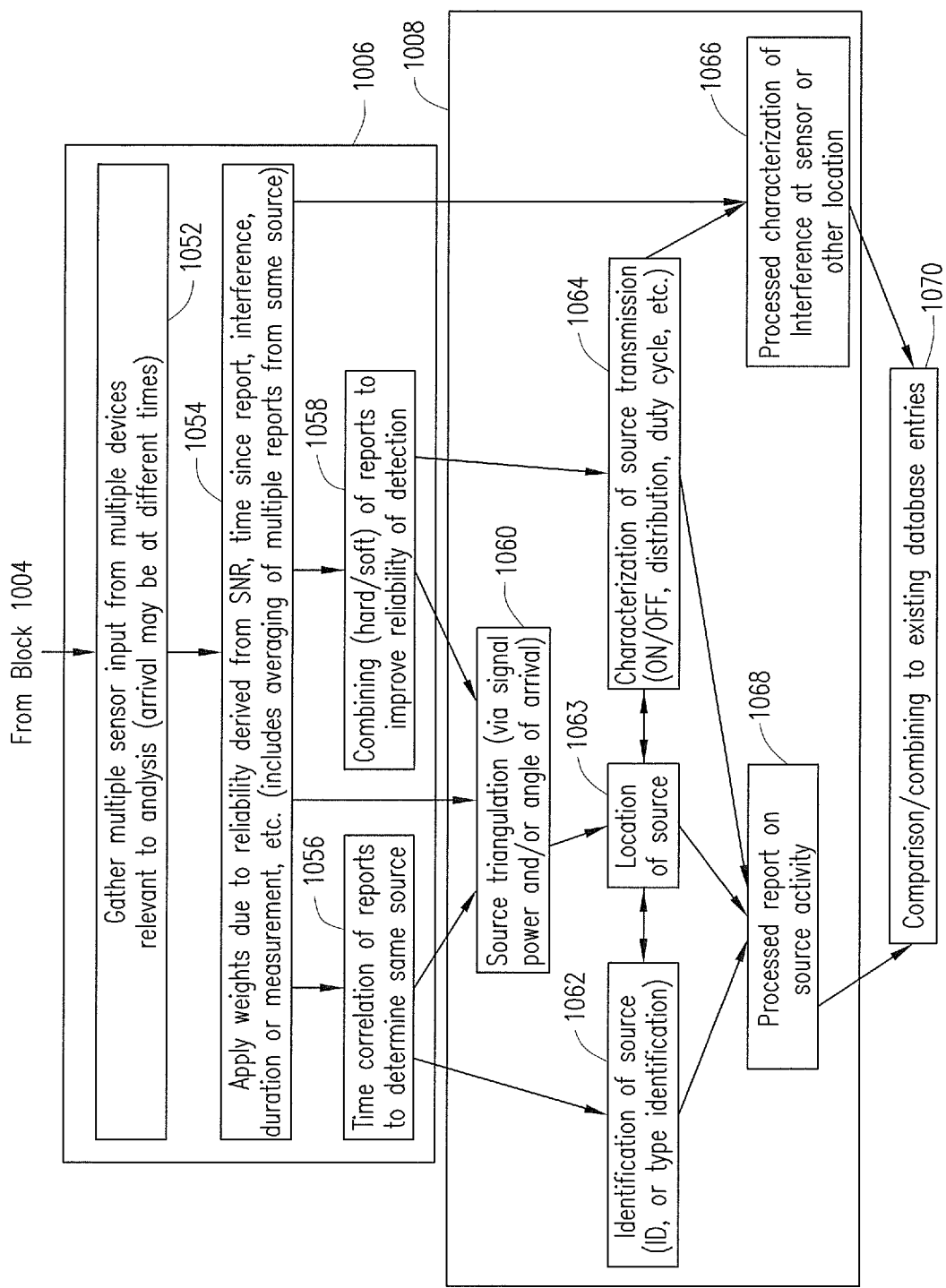

Taking reference now to FIG. 10B, additional details with respect to the processes set forth in blocks 1006 and 1008 may be described. The COLD server 1002 is operable to gather sensory information via methods including sending of explicit requests, scheduled requests, or by sensor configurations that are triggered to sense and/or report upon a specific set of conditions. In one implementation, reports from multiple sensors may be gathered, which can be correlated so that the same signal is not mapped multiple times, and its full extent can be determined (e.g., block 1052). Appropriate reliability weights may be applied before a correlation analysis is performed. The process of correlation may involve comparing the interference received at different times from different sensor reports. Commonalities in the reports can be seen as belonging to the same source. Other information can also be extracted for making such comparative analysis, which may include determining the signal's source and coverage. For example, if two or more reports identify an interference burst from the same source (by comparing the time of the interference and other characteristics of interference such as duration, bandwidth, etcetera), the level of interference power can be used to approximately determine the distance of the source from each sensor. By comparing such data, and averaging out time variations, an approximate location for the source can be estimated. The foregoing functionalities may be illustrated as blocks 1054 and 1056, for example.

In one arrangement, both "hard" combining and "soft" combining of reports may be incorporated to improve reliability of detection (block 1058). Also, in the case of determining an identity of an interference source, particularly bursts (e.g., when scanning for RADAR signals or occasional channel usage), the reports of time can be used to distinguish such signals from noise. In one variant of this embodiment, the reports for multiple sensors may be compared to verify that a burst received was in fact a source and not spurious noise. In another variant, the reports may be "soft-combined" (which involves combining weighted soft samples using a known technique) to improve the reception of the received signal, and allow a higher probability of successfully identifying the signal as (i) other-than-noise, and (ii) the identity of the transmission source (e.g., TV, RADAR, cellular RAT, etcetera). Reports can also be processed in other ways including soft-combining of sensory information to improve reliability through diversity, or using multiple reports to determine the location of interferer or the extent of its interference by determining interference strength contours. Directional information may also be useful in combining such measurements to locate the source of the signals that have been sensed. For example, directional information obtained by the sensor may specify the direction from which the signal was received. The COLD server 1002 may make use of reliability information provided or inferred to appropriately weight different sensing reports when processing database updates.

In some embodiments, during analysis of the information, the COLD server 1002 may also determine that critical information is absent or unreliable and request additional reports from the reporting or other sensory devices. In this way, the COLD server 1002 may assess the coverage and completeness of its channel occupancy and radio conditions database, and generate suitable queries to address any deficiencies. For example, in the process of determining the feasibility of channel assignment the COLD server 1002 can determine that information regarding the interference due to a specific source is unknown, unreliable, or outdated in a given region. The COLD server 1002 may request specific information from a nearby sensor node to address this deficiency. In another embodiment, the COLD server 1002 may also use the processed sensory information to trigger distribution of the information to other nodes that need it or may be affected by such information. Such nodes may have, for example, subscribed to receive reports involving certain frequency bands, levels of interference, signal types detected, or for certain geographic regions. For instance, according to one or more of the embodiments described, the COLD server 1002 may identify: (i) a location for a source of interference; and (ii) characteristics regarding the transmission from that source. Such information may be distributed to UE devices or nodes in the vicinity of the source.

The processed information may be provided to the analysis block 1008 as shown in FIGS. 10A and 10B. The overall functionalities of the analysis block 1008 may include, inter alia, source triangulation using signal power, angle of arrival, or both (block 1060), in addition to source identification, source location as well as characterization of source transmission (as exemplified by blocks 1062, 1063 and 1064). Processed reports on source activity and processed characterization of interference at the sensor (or other location) may be interfaced/updated to existing databases, which may include comparison to and combining with existing entries. The foregoing functionalities are exemplified in blocks 1066, 1068 and 1070).

The COLD server 1002 may also make use of when the information was recorded and for how long it is expected to be valid (i.e., duration). Such information may be useful in processing reports in view of correlated reports that were recorded at the same time from different sources, and also to decay the relevance of the reports as the time since the measurement increases conditional to the expected duration of the interference. For example, database information of interference that was due to short-term traffic may be considered with less reliability, or discarded after some time in comparison to newer reports. In general, the total information gathered and processed may be used to update the database, whereupon such information may be queried by the various elements of the network for purposes of radio resource management throughout the network.

In certain aspects, the COLD server database 1016 may be used as either a complementary radio resource database or as an integral part of the RRM system of an existing mobile communications network. In other aspects, the COLD server 1002 may act as a supervisor of the RRM systems operating in diverse locations and networks (e.g., with different RATs and having overlapping coverages). The COLD server 1002 may be configured to provide approval for resource requests by the RRM of the network. As described previously, the COLD server 1002 in certain configurations may provide the radio resource assignments in response to a radio resource request, thus enabling the COLD server 1002 to act as the radio resource manager. The COLD server 1002 may allocate channels for only a subset of the radio resources of the network; for example, the channels that enable shared spectrum pooling or it may make assignments for a superset of channels affecting multiple diverse systems. In another arrangement, the COLD server 1002 may provide only information to the RRM functions of the network and suggest "clear" channels appropriate for use in response to requests for specific areas and c The COLD server database 1016 may also be configured to report and possibly resolve potential resource conflicts in the network (i.e., policy manager functionality). For example, the database may receive reports of relatively higher levels of interference in a given location/channel. With the information available at the database, the COLD server 1002 can initiate one or more of the following actions in a non-limiting manner: (i) report radio resource conflict to the network, base station(s), or UE device(s); (ii) suggest alternate available sources; (iii) suggest conflict resolution by re-assignment; (iv) assign alternate radio resources or other RRM assignment(s); (v) request additional sensory information from sensory element(s); (vi) suggest alternate multiplexing or time for transmission; (vii) issue a restriction for channel/location (which may also include a time restriction); (viii) issue a usage policy or protocol to be followed in a given channel and location. In some embodiments, the COLD server 1002 may also react in a preventative manner by using predictive methods. For example, the COLD server 1002 may extrapolate from historical activity to anticipate radio resource occupancy in a given location, time and channel. If such activity may result in a conflict (e.g., excess interference), the COLD server 1002 may issue instructions to the base stations or UE devices to use alternative channels or time slots. In another alternative, the COLD server may predict a channel conflict by monitoring one or more moving transmitters or receivers, moving along a path where they may cause or experience unacceptable levels of interference. To assist in resolving such issues, the COLD server 1002 may initiate one or more of the actions or measures set forth hereinabove in a preventative manner.

In some example implementations, the COLD server functionality may be distributed across network nodes. The structure and function of a distributed COLD server arrangement are basically the same as described in the foregoing sections concerning a centralized COLD server, e.g., COLD server 1002 illustrated in FIG. 10. In a distributed COLD arrangement, appropriate communications protocols may be established to connect the nodes to the distributed information database(s). Nodes may also query other nodes for updated information on channel occupancy and locations in surrounding network locations. Accordingly, the distributed databases (which may be located in base stations or other network nodes) are configured to exchange information, reports and other sensory data.

It should be appreciated that in the example implementation illustrated in FIG. 1B, one or more UE devices are provided with COLD databases as described in additional detail hereinabove with respect to the radio network environment 100B of FIG. 1B. In a further variation, the COLD server 160 disposed in the network environment 100B of FIG. 1B may be replaced by distributed COLD servers within the UE devices, e.g., UE device 110-3C, UE device 110-4, etc. As previously mentioned, it is not necessary that all UE devices in the network have COLD server functionality. In addition, the UE devices that do have the COLD server functionality may not have the same capability of sensory, reporting and/or database functions. In order to ensure efficient operation of distributed database elements, certain methods and processes exemplified below may be employed with respect to a UE device's COLD server functionality: (i) receive sensory reports from other network networks nodes or databases; (ii) process sensory reports from other elements, possibly including information from its own reports; (iii) communicate the sensory information to other devices and network nodes; (iv) receive processed information reports from another node; (v) store the received information from other devices and network nodes; (vi) store in a database information relating to channel occupancy and parameters and for various locations (e.g., a location-based information map); (vii) process the sensory and stored database information; (viii) share/exchange information with other databases and nodes; (ix) authenticate sensory reports; (x) apply processed information for radio resource management; (xi) use sensory and database information in selecting device operation for the radio resources and radio access technology formats.

Figure 11:
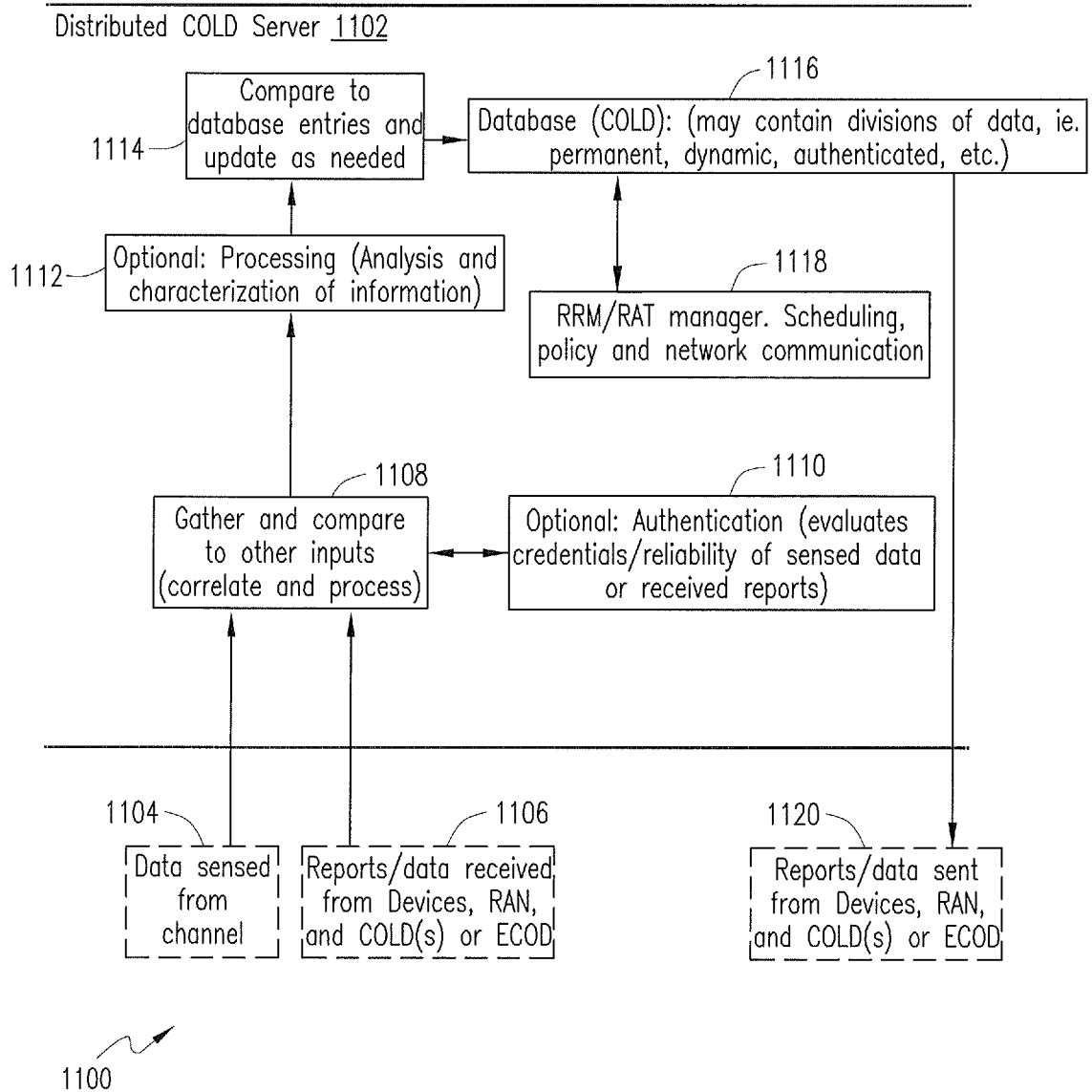
FIG. 11 is a diagrammatic representation illustrative of exemplary processes with respect to an embodiment of a distributed COLD architecture of the present patent application.

FIG. 11 is a diagrammatic representation illustrative of exemplary processes with respect to an embodiment of a distributed COLD architecture of the present patent application. As before, a distributed COLD server process 1102, which may be executed at a UE device or other node having the COLD functionality, may include one or more sub-processes, modules or functional blocks for effectuating the overall distributed COLD architecture. Data sensed from channel scanning (as exemplified in block 1104) may be gathered and compared to other inputs (for correlation and comparison analysis, among others) as set forth in block 1108. An optional authentication block 1110 may be provided for evaluating credentials and/or reliability of the sensed data, which also receives reports and data from other devices, RAN(s), and other distributed COLD nodes and/or any external databases (as exemplified in block 1106). An analysis and processing block 1112 may be provided for analyzing and characterizing the information. It should be noted that the functionalities of process blocks 1110 and 1112 may be provided as optional functions in certain distributed COLD server implementations. An updater block or sub-process 1114 is provided for comparing the new data with the existing data so that the database may be updated as needed. A local COLD database 1116 is operable for storing the processed/updated sensory data and reports, which may contain divisions or segmentations based on characterization such as, e.g., "permanent", "dynamic", "authenticated", etc. An RRM functionality 1118 is provided for managing RAT/resource assignment, scheduling, policy management and network communications as described previously. The local COLD database 1116 may also interface with the RRM functionality 1118 for providing appropriate resource assignment messages, reports and sensory data, etc. to other devices, RAN(s), COLD servers as well as any external databases (as exemplified in block 1120). In general, those skilled in the art should recognize that the processes set forth in blocks 1108 and 1112 may largely encompass the functionalities of blocks 1006 and 1008 described in detail above in reference to FIG. 10B. Additionally, the processes may be performed in any combination, order or sequence of the various sub-processes of the processes, including omission of some sub-processes.

As described for sensing elements in the embodiments in earlier sections of the present disclosure, the UE devices sense the channel occupancy and associated radio conditions, and generate reports on sensed data for processing at a network node or a COLD server. In some cases such reports can also be processed at the UE devices, and only database updates may be transmitted between the UE devices. In the case of distributed COLD server functionalities located at a plurality of UE devices, the information may be transferred using one or more of the procedures described herein such as device-to-device communications (WiFi ad hoc or WiFI direct mode communications), distribution of sensory reports, or transmission of processed reports or database updates. In some embodiments, the information transmitted to each mobile node need not be the same as not all nodes require reports from all locations or channels (or some may not require this service at all). For example, reports can be restricted to nodes with a specific proximity from the originator of the report. In some cases, reports can be sent to mobile nodes in response to a query or standing forwarding request for reports or a specified subset of the reports. Distribution of the reports may be effectuated through broadcast channels (for example, such as SIB/MIB messages in LTE implementations) or mobile-specific messages (for example in LTE implementations, as a specific message carried by the PDSCH channel to a UE device, or in general via MMS, SMS or IP data).

Figure 12:
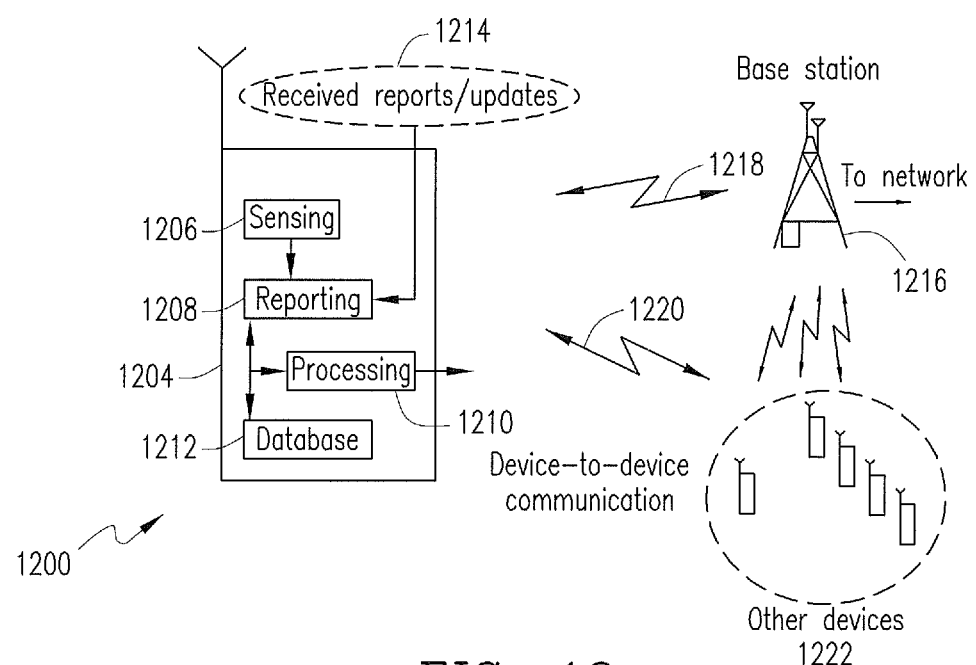
FIG. 12 is an arrangement illustrative of an example radio network scenario where multiple sensing elements (e.g., UE devices and network nodes) interoperate in a distributed COLD environment.

In other embodiments, individual reports can be broadcast to UE devices whereby correlation and processing of the sensory reports can occur at the each mobile node. FIG. 12 is an arrangement illustrative of an example radio network scenario 1200 where multiple sensing elements (e.g., UE devices and network nodes) inter-operate in a distributed COLD environment. UE device 1204 is illustrative of a mobile sensing element or node that is operable to receive sensory data reports and/or updates from other nodes (mobile/nomadic nodes or fixed nodes) within the network, including for example a base station or eNB node 1216 or other UP devices 1222. The example UE device 1204 includes sensing functionality 1206, reporting functionality 1208, a database 1212 as well as a processing entity 1210 that controls the overall COLD server processes at the UE device 1204. Device-to-multi-device communications 1220 may be employed to provide sensory reports and/or updates to other devices 1222 whereas uplink/downlink communications 1218 may be employed for communicating sensory data reports and/or updates to the base station 1216 or to beyond the range of device-to-device communications. In some variants of the foregoing embodiment, UE device 1204 may accumulate the reports, including sensing information of its own, and processes the cumulative information (in a manner similar to that described earlier for processing reports) in order to reliably determine the channel occupancy at different locations, as well as additional characteristics of the interference such as RAT type, bandwidth, power, etc. In a still further embodiment, another form of distribution of reports and database information may be achieved through mobility. The UE devices may roam in multiple geographical locations, and can therefore be configured to provide information through previous reports or database information on its previous locations. As described, the information can be distributed to the COLD server's new location through device-to-device communications or communications with the network (which may be followed by broadcasting the messages to devices near the network node).

In some embodiments, a device, network element or database may query another network element for information on upcoming channel use. This is a different type of report that allows other elements of the network to be aware of channel occupancy in the future (i.e., predictive information reporting). Examples of such information are those that can be provided by any network node that has scheduling information (for instance, a base station), or an element that is involved in ongoing communications. In some variants of the embodiment, the information can also include predictive location information. For example, a sensing element may be moving and report that it will be at a new location at some time in the future. In a still further variation, the sensing element may also report, for example, the planned use of a channel at some future time or location. For example, the sensing element may report an upcoming persistent assignment made to it by the LTE network, where the assignment is periodically occurring for some duration. In yet another embodiment, a UE device may query another UE device for such information regarding future transmissions by the UE device (i.e., the queried device) or its network. Such information can be processed and included in the databases as with other reports of real-time channel usage.

The use of predictive reports, however, may introduce the danger that some "rogue" or "unauthorized" nodes may also receive the sensory reports, which may use the predictive information to either block the predicted radio resource usage, or to divert the radio resources for their own purposes. To protect against this danger, in some embodiments the predictive information reports may have the identity of transmitter/receiver disguised or otherwise scrambled in order to prevent or at least reduce malicious use of the sensory information and/or radio resource assignment information. For example, the identity may be hidden by means of the receiving database not including the source address in further distribution of the information. In some embodiments, to protect the identity of the sender when transmitting the report, the sender may use a local ID that is not public, for example, a Radio Network Temporary Identifier (RNTI) as assigned by radio access network (RAN), that is not traceable to the actual identity of the sender except by trusted nodes within the RAN.

In some embodiments of a distributed COLD architecture, the information exchange between distributed COLD servers and sensing elements can be managed by using subscription service and distribution centers. In an example implementation, both sensory reports and database updates may be transmitted and received using a subscription methodology. Such reports and/or updates may originate from distributed sources, or can be consolidated at a central or regional center(s). From these points, the information may be transmitted throughout the network to distributed database locations. In some variants, distribution lists can be used in order to send the information to the distributed COLD servers. The distribution lists can be subject to constraints of distance from the point of origin, or valid for only specific regions, frequency bands or levels in a hierarchy of databases. Limiting the distribution of the sensory reports, processed information reports and/or updates in this manner may have the advantage of reducing the volume of traffic in the network, thereby preventing the network becoming overloaded with messages being sent to places where they are not needed.

In some example implementations, the distribution list information can also contain constraints on the type of information requested for each database. For example, a UE device database may not need to know dynamically changing channel occupancy information from a far away location, but may be interested in primary user information in its vicinity. Location can be based on global position references (e.g., via GPS) or related to the network cell ID. Moreover, in some example implementations information classes can be introduced to facilitate efficient distribution of information. The class of information can refer to the general class of the interference which relates to its source and expected duration. Illustrative examples of possible classes are: (i) dynamic interference (referring to a single observed event at some frequency and time; (ii) semi-static/primary user activity; (iii) static/regulatory; (vi) location/region area; (vii) frequency band; and (viii) RAT.

In an additional variation, distribution centers can be defined as "regional" where the information that is most relevant to users and RRM database(s) within a reasonable proximity is provided. As an example, a regional distribution center may be located within or hardware-attached to base stations or regional base station controllers. Furthermore, distribution of information may include both database updates as well as sensory data reports. As not all information may be gathered by each sensing element, the information content can differ greatly. Accordingly, additional classes of sensory information and classes of database updates can be defined based on the information content. For example, the following classes of information can be defined to identify reports that contain only interference information and others that contain more detailed information: (i) basic: in-band interference measurement only; (ii) identifiable: interference with knowledge of RAT and can include broadcast parameters (if available); (iii) detailed scan: an interference scan of a frequency band with information of possibly several sources of interference, which may or may not be RAT-identifiable; (iv) predictive: detailed knowledge of interference event that will occur at a future time.

In a still further variation, implementation reports and database updates may be distributed through the network in a broadcast format. Additionally, the information may also originate or be filtered and re-distributed by central or distributed regional centers. Distributed COLD servers may operate as regional centers to perform the filtering/redistribution process, but other network elements such as, e.g., properly configured base stations, network hubs, GGSNs, etc. may also be involved in redistribution. In some embodiments, the reports and database information may include descriptive headers so that receivers can determine if the broadcast information is useful for them to decode. In this process, the receivers are informed of the meaning of various headings through broadcast information when subscribing to the service. The receivers may be configured to examine the headers on different broadcast message that arrive, and based on the examination may continue to decode and process the reports that pertain to the receivers' channel usage and/or location, depending on the configuration. Identifying the class of information or class of sensory report(s) or update(s) are examples of possible descriptive headers. In some implementations, information may be distributed to databases by both broadcast and subscription methods.

With respect to RRM functionality, a UE device requesting a particular channel for communication can use the information in its local COLD server database in order to specify desired channel(s) and its parameters. For example, the UE device may be configured to generate a request for resources specifying the exact resources and/or other parameters. In an example implementation, such a request can include specifying a RAT, or parameters of RAT that are best suited to the channel usage as known to the UE device through its own sensory data gathering as well as reports and/or database updates from other distributed nodes. For instance, the database may choose a RAT that has the flexibility to schedule the UE device communications in time and frequency (i.e., the resource grid in an LTE network implementation) such that it avoids the transmission pattern of the existing channel usage. In such an arrangement, the UE device may be configured to adjust one or more transmission parameters to avoid interfering with another communications channel, including but not limited to symbol shaping filter roll-off, transmit power, spatial pre-coding vector/matrix, direction of transmission, polarization, etc.

In another implementation, a UE device may be configured to make use of the COLD server database information in negotiation for device-to-device communication sessions. In the process of session set up, the UE devices can exchange information from each respective COLD server database in order to determine an appropriate channel for communications. It should be appreciated that such information exchange may include predictive information of upcoming transmissions. In one example variation, the initiating device may be configured to suggest a possible channel for communication based on its database information. Further, the device may also include a database report to provide status information regarding the channels visible to the initiating device. The terminating device may accept the channel assignment suggested, respond with a new channel suggestion, or respond with database information of its own. Additionally, the initiating UE device may also choose or suggest a RAT, or optional parameters within a RAT that will be most suitable given the information known about the channel and its usage at its location, and the other device's location. For example, a device may determine that only a narrowband of spectrum is available for communication, whereupon the device may suggest communication over the narrowband channel using a RAT that is appropriate for that bandwidth.

In further embodiments with a distributed COLD architecture, the reliability of the sensory data reports and/or database updates may be assured by screening and authentication. As described previously, reports and updates may be transmitted from sensor nodes across the network and distributed databases and exchanged through mechanisms including subscription and responses to queries. The authentication of reports/updates can be controlled by indicating the origin of the report/update in the message. In this manner, the recipient can choose to accept reports/updates from only trusted sources. In another variation, the report/update may also be encrypted such that only certain recipients can correctly receive the report. Accordingly, any number of suitable cryptographic methodologies may be used to verify the authenticity of exchanged sensory data reports and/or updates. For example, the report/update may be scrambled by a sequence known only to subscribers such as a subscriber ID. In another variation, the known sequence can be used in a method for addressing the report/update as well. In a still further variation, multiple reports from different sources can help confirm the validity of the report in some cases.

In a further embodiment, authenticating sensory data reports and/or database updates at a database may be achieved by evaluating certificates that are included in the message and have been issued from a source trusted by both the sender and the receiver. Alternatively or additionally, the identity of the originating device may be used for authentication as well. The originating device can be identified by including in the report the device ID, MAC ID (RNTI or local ID) or the serial number of the device or some combination thereof. In a still further variation, the reporting message can be tagged with a code from a specific codebook or code generator, based on a key exchange between the device and the database. In a variant of this implementation, the authentication key may be given to the device as part of an off-line registration process. For example, the key may be exchanged over a secure, wireline link so that the danger of wireless eavesdropping of the message is eliminated. In one example, the key is issued from a trusted source and the identifying tag for sensing messages may be based on a perturbation of the device ID or serial number (e.g., a known changing perturbation).

In another embodiment, a sensing element may be required to answer a periodic challenge question by the receiving database (i.e., a challenge-response protocol). In one related implementation, the sensing element may be provided with answer(s) to challenge questions(s) from a database or database(s). A challenge from the receiving database may be issued to sensors issuing report(s) that must be answered and verified. The challenge and answer/response transaction confirms the identity of the source and sensing reports received. The database may be configured to monitor validity of previous reports tagged to a given sensor by confirming interference activity and issuing challenge questions occasionally to confirm identity. The database may use its estimate of the accuracy of the received reports to rate the reliability of the reports. Such reliability ratings may be used to weight the future reports from the sensor in processing so that if the reports are historically inaccurate the sensor will be rated lower and its sensor reports will not be considered reliable or potentially not valid.

Based on the foregoing, an exemplary implementation of a method of processing sensory reports of one or more sensing elements may be described as part of a COLD server process in, e.g., in a distributed COLD system as shown in FIG. 11. As described previously, a sensory report from a sensing element operating in multiple radio technologies (RATs) may be received at a node of the COLD system, wherein the sensory report includes sensory data associated with multiple radio channels relative to at least one radio element. The process may involve identifying the sensing element's identity and determining if the sensory report has been tagged with a code generated by a predetermined code generator. Responsive to the identifying and the determining, the COLD server process may proceed with authenticating the sensory report and correlating the authenticated sensory report with at least one of one or more previous sensory reports from the sensing element and one or more previous sensory reports received from another sensing element. It should be realized that the software and hardware resources of the COLD system (e.g., processors, memory, I/O communications subsystems, etc.) may be adapted as components configured to perform the foregoing acts in accordance with overall processor control.

In order to combat devices using a false identity and issuing a message containing sensing reports and/or database updates sensors, issuing elements may be configured in one embodiment to monitor the sensing reports and/or database updates being transmitted in the network to detect if their identity is used in an unauthorized manner. Where fraudulent use is detected, such use may be reported to the COLD server databases of the distributed architecture for potential censure. In one arrangement, sensory reports may include a unique report number (for example an incremental message number) that may be used by the receiver to detect duplicate messages, missing messages or false messages sent by rogue nodes. If the receiver receives a duplicate message with the same content, it is likely the result of a re-transmission within the network. However, if the duplicate messages have different contents, it is likely that they are false reports.

In another embodiment, sensory data reports and/or updates can also be filtered from the network by screening nodes. Such nodes may be located at any point of the network, e.g., a base station, as well as co-located with the mobile sensing elements (i.e., UE devices). Similar to the authentication/verification functionalities set forth above, the screening nodes may be configured to determine the authenticity of the report(s) and/or updates and remove reports/updates that do not meet the requirements of a preconfigured verification process. In this manner, fraudulent or erroneous reports may be prevented from propagating through the network and corrupting the databases. Reports/updates that are deemed trustworthy can continue to circulate and be distributed to update the databases. With the presence of such filters for non-authenticated reports, not all device-based or distributed databases need to possess complete or full-scale security systems for report/update authentication. In one variation, a COLD sever may be configured to provide a screening function to filter unreliable reports. Accordingly, the distribution of false sensory information may be limited without the requirement for each receiving node or database update module to include an independent authentication process. As a further variation, information distributed throughout the network can also be filtered based on its time stamp and duration. As described earlier in the present patent disclosure, sensory data reports can include time information as well as the duration for which the information is valid (e.g., static, 1 ms, 1 hour, and the like). Accordingly, any information that has expired or has become stale may be removed from the distribution streams and storage.

Figure 13:
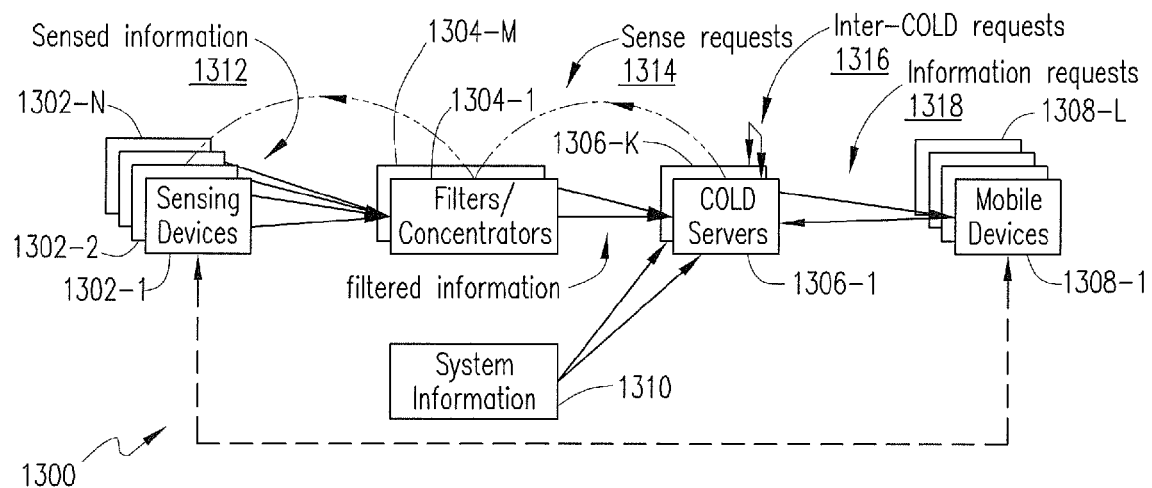
FIG. 13 is an arrangement illustrative of an example radio environment with multi-system mobile networks that may interoperate for purposes of radio resources management according to an embodiment of the present patent application.

It should be appreciated that the COLD server arrangements and processes set forth herein may be used for coordination among devices operating in multiple mobile radio networks, wherein such devices are capable of operating with multiple networks and utilizing multiple RATs. Their operation, however, needs to be coordinated with other local devices and the larger network base stations and networks that may also be using the same radio resources and with overlapping coverage. FIG. 13 is a diagrammatic representation illustrative of an example radio environment 1300 with multi-system mobile networks that may interoperate for purposes of radio resources management according to an embodiment of the present patent application. A plurality of sensing devices or elements 1302-1 through 1302-N are operable to provide sensory data 1312 to one or more filters/concentrators 1304-1 through 1304-M. In accordance with the processes described in detail previously, the filters/concentrators provide filtered information to one or more COLD servers 1306-1 through 1306-K that may be arranged in a centralized or distributed architecture. Depending on the configuration, there may be inter-COLD requests 1316 for sensory data reports and/or updates. A plurality of UE/mobile devices 1308-1 through 1308-L are configured to receive suitable requests and information 1318 from COLD servers 1306-1 to 1306-K. As described in earlier sections, COLD servers 1306-1 to 1306-K are also operable to generate sense requests 1314 to one or more sensing devices via filters/concentrators 1304-1 to 1304-M for receiving the filtered sensory reports and/or database updates (i.e., filtered information).

The sensing devices (e.g., UE devices, access points, base stations, etc.) sense conditions of the radio resources in their local area as set forth hereinabove. In one arrangement, each device may include aspects of sensing device, filter/concentrator functionality, COLD server functionality and the functionality of a mobile device. Mobile devices may perform sensing as part of their normal operation or they may be requested to perform sensing and provide sensory information to a COLD server (as a result of receiving sense request messages from other devices). The sensed information is sent towards the COLD servers (of which there may be one within the sensing device, and others in other devices). As discussed previously, the sense requests and the sensed information may be communicated among the devices using any of a number of possible known formats including IP datagrams transported over the network connections of the devices or messages embedded in the data signaling channels of the radio access technology (e.g., PUCCH/PUSCH/RACH channels in an LTE network implementation). In a further variation, the sensing requests and information may be distributed, for example, using "emails" or SMS or MMS communication among devices. Where some sensing devices are connected to the network using "wired" links, suitable IP datagram formats may be used for information transmission.

In accordance with the embodiments discussed previously, the sensed information may include, for multiple radio access technologies and networks, the occupancy (or non-occupancy) of channels, the signal strength of signals received, the signal formats (i.e., RAT) received on channels or identification of the devices or their network affiliation. The sensed information may be filtered by an intermediary filter/concentrator function (e.g., which may be distributed as filter/concentrator nodes 1304-1 to 1304-M) described above. The filter/concentrator function may act as a regional collection/distribution point that filters and routes the sensed information to the appropriate COLD servers depending on the intended recipient devices. As discussed before, the filtering functionality may be based, e.g., on geographic region, RAT, commercial network vendor, frequency band, time of occurrence or other attributes. The filter/concentrators 1304-1 to 1304-M may also perform functions such as removing duplicate messages or redundant or expired sensed information. Additionally, the filter/concentrator function may be configured to calculate the average of sensed parameters (or the peak, in one variation) from several sensors and generate information summary reports for appropriate COLD Servers 1306-1 to 1306-K. The filter/concentrator function may also monitor the sensed information and detect the addition of new devices in the region (i.e., new devices or network facilities turned on or off, e.g., a new home Node B turned on or of), or a change in their configuration, and generate a report of these events for the appropriate COLD servers 1306-1 to 1306-M.

The filter/concentrator function may also consolidate sensed information reports from multiple devices into combined information reports for the COLD servers. This consolidation of multiple messages by the filters has the advantage of reducing the number of sensory messages flowing through the network and hence minimizing the traffic burden on the network. In some implementations, the filter/concentrator function may be a component of the mobile network base station, base station controller or access point. In another implementation, the filter/concentrator may be a functionality co-located with a sensing element or COLD server or the mobile device. In some cases, there may also be sensing devices that function only to sense and report information about their local radio conditions. Those skilled in the art will recognize that the filter/concentrator function and/or the COLD server function may be implemented as computer applications (i.e., programs or code) associated with suitable information storage on general purpose computing devices (either as a computer platform configured to operate as a node on the network or as part of a processor in a UE device).

In accordance with the embodiments discussed above, the distribution of the sensed and filtered information may be accomplished using a number of methods. Further, several methods may also be used concurrently. One of the functions of the filter/concentrator entity is to distribute the sensed information among the appropriate devices and their COLD servers. The information may therefore be categorized, for example, according to geographic location, region, RAT, device type, commercial network vendor, frequency band, etc. as described previously. The filter/concentrator function may then send the reports to COLD servers that have requested information in a particular category (e.g., those that have "subscribed" to this category of information). COLD servers may subscribe to more than one category of information, and in one implementation, a report of sensed information may be directed to multiple devices. In this "subscribe/publish" distribution model, the COLD servers subscribe with the filter/concentrator function indicating their categories of interest. The filter/concentrator may be configured to maintain the subscription information on an updated basis and forward sensed information to the validly subscribed COLD servers.

In an additional variation, a COLD server may request from the sensing devices, via the filter/concentrator function, sensed information of a particular category (e.g., geographic region or frequency band). In FIG. 13, such requests are illustrated as sense requests 1314. Upon receiving a sense request from a COLD server, the filter/concentrator function may then request sensed information from the devices that have provided such information previously. The new sensed information reports may be passed back to the requesting COLD server as well as to others that may have subscribed to the particular category of information. In addition to subscription lists, the filter/concentrator function may also make use of, for example, location information, to direct reports to appropriate devices and their COLD servers. For instance, the filter/concentrator may store the geographic region, frequency band, RAT, or network affiliation for COLD servers and forward incoming sensed information reports matching these categories to such COLD servers.

Whereas the COLD servers 1306-1 to 1306-K are operable to receive the filtered information reports from the sensing devices (via the filter/concentrators 1304-1 to 1304-M), they may also make use of information, such as network topology, from a System Information Database 1310. The filtered/sensed information provides the COLD with current measurements (typically dynamically changing) about the activity affecting radio resources in its area of interest. The System Information Database 1310 (which may be co-located with the COLD server(s) or may be a network resource) provides information about the system configuration, such as location of base stations, coverage regions and business arrangements with other radio resource users in the area, which is largely static in most arrangements.

Continuing to refer to FIG. 13, the COLD server(s) may additionally consolidate the sensed and system information and provide response to information requests 1318 from the devices 1308-1 to 1308-L. The mobile devices 1308-1 to 1308-L may, for example, request the COLD server(s) to provide information about current and potential channel usage in their radio frequency band and location area. Such information may be employed by the devices to determine the appropriate radio resources to use. As described previously, in some implementations the COLD server(s) may include RRM functionality and therefore may be configured to provide the requesting device with recommended radio resource allocations. For example, if there are no regulatory limitations and the level of interference is sufficiently low, a COLD server may respond to a request with an available channel in response to an information request from a device. In other situations, the COLD server may respond that radio resources are unavailable due to commercial or regulatory constraints, or that the sensed information indicates that radio resources are unavailable due to interference. In still further cases, the COLD server may respond to the requesting device(s) with the current information of radio resource conditions (e.g., levels of interference reported by sensors) for their location and the inquiring device may use this information to guide its selection of resources.

As illustrated in FIG. 13, there can be more than one COLD server within a network, or among multiple networks. In terms of architecture, a COLD server may be organized in a hierarchy of databases based on geographic region, which may also be further categorized based on RAT(s), RF band(s) or the commercial arrangements of the network operators. In the case of categorization based on geographic region, there may be regions of adjacent or overlapping coverage. When a mobile device that is near or within the overlapping/adjacent region requests information from one of the COLD servers having overlap coverage, additional intelligence may be provided or resolving such a request. For example, a COLD server, upon recognizing the location of the device in an area of adjacent or overlapping coverage, may request information from neighboring COLD servers about the conditions in the overlapping/adjacent area. Such "cross-area-verification" of the data may enable the serving COLD server to provide more accurate information about current radio resource conditions in the area.

As pointed out previously, a COLD server may consolidate the sensed and system information in a number of ways that enable it to better respond to requests for information. For instance, consolidation of information may include categorizing the information based on commercial association (e.g., network operator), frequency band, access technology (e.g., GSM, UMTS, CDMA, LTE, etc.,) or geographic region. The COLD server may be configured to facilitate information requests that cross category boundaries. For example, sensed information from multiple RATS or network operators may be requested and such requests may be serviced appropriately. The COLD server processes, discussed previously in reference to FIGS. 10 and 11, inter alia, are operable to determine available radio resources for a device based on local information received and the reports from other appropriate sensors. For example, the determination of channel availability may include consideration of: (i) interference beyond regulated parameters within the operation or coverage of primary users; (ii) the traffic channel loading; (iii) the channel with the least interference or otherwise with acceptable levels of interference or activity; (iv) the suitability of the radio access technology for the desired service (e.g., voice, data, or video services); (v) commercial relationship(s) of the device user with the network; (vi) compatibility of the channel with other concurrent services; (vii) location restrictions for use of the channel; (viii) time constraints for use of the channel; (ix) suitability for services of the channel and associated radio access technology and network. In some embodiments which may be used in conjunction with other embodiments, the response messages from a COLD server may also include restrictions as to the usage of channel. That is, a COLD server may restrict the range, distance, or other geolocation with respect to using the particular channel. As set forth previously, the COLD server may also restrict transmit parameters of the device's transmission with respect to the requested channel (e.g., RAT, MCS, maximum transmit power, etc.).

It should be recognized that in certain situations, some of the sensing devices and the mobile devices of multi-network environment 1300 of FIG. 13 may be the same. Accordingly, some devices may also provide sensed information in addition to requesting information from the COLD server. For example, when a mobile device is activated, it may inquire of the COLD server to determine the local radio resource usage and system conditions and then choose an appropriate radio resource allocation (e.g., radio access technology, subtending base station and channel). Once it is activated, the device may provide sensed information to the COLD server in the network or to those in appropriate devices.

Referring back to FIG. 3 and in conjunction therewith, any of the sensing devices 1302-1 to 1302-N or mobile devices 1308-1 to 1308-L (shown in FIG. 13) may be realized as UE device 300 illustrated in FIG. 3 in one exemplary embodiment. The sensing, filtering and COLD processes set forth above may be realized as executable code or programs 350 operating on processor 302 in conjunction with other subsystems of the device 300. The sensing process interacts with the device's communications subsystem 304 and its associated radio transceivers and antennas for effectuating sensing of the radio conditions including signal strengths, signal timing, RAT(s), network identification, identification of devices transmitting signals and interference in the channels of interest. The sensory information may be stored in RAM 330 or Flash memory elements 335 as directed by the sensing and COLD process 350. In addition, the communications subsystem 304 may be configured to monitor the signaling between the communications network and devices to determine the activity in the channels of interest to the device 300, which may also be stored in a suitable memory as directed by the sensing and COLD process 350. The Communications subsystem 304 may also receive messages with sensory and database information from other devices and nodes in the communications network, which is also suitably stored in the device. The information in the RAM or Flash memory elements is processed by the COLD process 350, which may involve formatting of sensory and database information for the reporting to other devices and nodes in the network. Such reports may be transmitted via the communications subsystem 304. The processing may also include determining if channels are suitable for use by the UE device. The selected channels may be communicated to communications subsystem 304 which configures the radio transceiver circuitry 306 to operate on the selected channels using the appropriate band and radio access technology.

Accordingly, in certain device embodiments, many of the elements of the sensing, filtering and COLD processes may be incorporated as a program capability within aspects of the main processor of the device. The communications subsystem, for example, may use the existing antennas and transceivers in the UE device. The sensing apparatus may be incorporated within existing sensing capabilities of the radio transceivers of communications subsystem of the UE device. The storage of sensing information, sensing reports and COLD processing may be incorporated within the memory and main processor apparatus of the mobile device.

It should be further appreciated that the COLD server arrangements and processes set forth hereinabove may also be used for coordination of radio resources with respect to elements such as femto cells, pico cells, home node B (hNB) elements, and the like. As mentioned before, a femto cell is essentially a small cellular base station, typically designed for use in a home or small business, and connects to a service provider's network via broadband (such as DSL or cable, for example). Current designs typically support 2 to 4 active mobile phones in a residential setting, and 8 to 16 active mobile phones in enterprise settings. A femto cell allows service providers to extend service coverage indoors, especially where access would otherwise be limited or unavailable. A pico cell is a wireless communication system typically covering a small area, such as in-building (offices, shopping malls, train stations, etc.), or more recently in-aircraft. In general, a pico cell is analogous to a WiFi access point. Such elements providing specialized coverage in a mobile communications network may be added or removed from the network as usage and business conditions dictate, but they require coordination with the radio resources being used by devices that may be nearby. Typically the femto cells and hNB nodes are of low power operation, and their use of radio resources (e.g., radio frequency channel, time slot, spreading code or sub-carrier grouping) is confined to a localized area. On the hand, their operation may have to be coordinated with other local femto cells and hNB nodes as well as the larger network base stations that may also be using the same radio resources and with overlapping coverage. Where such elements are deployed in a multi-network environment such as the environment 1300 illustrated in FIG. 13, a femto/pico cell or hNB node may inquire of a COLD server to determine local radio usage conditions and then choose an appropriate radio resource allocation or receive a suitable radio resource assignment from the COLD server as described above.

Various processes, structures, components and functions set forth above in detail, associated with one or more network nodes, COLD servers or sensing devices, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A method of processing sensory reports of one or more sensing elements in a radio network, said method comprising:
receiving, at a network node, a sensory report from a sensing element operating in multiple radio access technologies, said sensory report including sensory data associated with multiple radio channels relative to at least one radio element;
identifying, at the network node, said sensing element's identity and determining if said sensory report has been tagged with a code generated by a predetermined code generator; and
responsive to said identifying and said determining, authenticating said sensory report and correlating, by the network node, said sensory report from said sensing element with at least one of one or more previous sensory reports from said sensing element and one or more previous sensory reports received from another sensing element to facilitate alleviating interference or congestion.

2. The method of claim 1 further comprising uploading said correlated sensory report to at least one of a local database and a remote database of a distributed channel occupancy and location database system associated with said radio network and an external database having channel occupancy data relating to an unlicensed spectrum.

3. The method of claim 1 further comprising transmitting a control message to said sensing element, responsive at least in part to said correlated sensory report, for effectuating allocation of a radio resource to said sensing element.

4. The method of claim 1 further comprising transmitting a control message to said at least one radio element, responsive at least in part to said correlated sensory report, for effectuating allocation of a radio resource to said at least one radio element.

5. The method of claim 1 wherein said sensing element's identity comprises at least one of a radio network temporary identifier and a serial number.

6. The method of claim 1 further comprising determining that said code for tagging said sensory report was generated based on a known changing perturbation of said sensing element's identity.

7. The method of claim 1 wherein said sensory report includes data associated with a particular radio channel of said multiple radio channels, said data comprising at least one of: a location of said at least one radio element operating in said particular radio channel, an interference level of said particular radio channel, an interference signal bandwidth, a center frequency of a radio signal sensed in said particular radio channel, an type identification of a radio signal sensed in said particular radio channel, a radio access technology type associated with said particular radio channel, a network identifier associated with said particular radio channel, a transmitter identifier associated with said particular radio channel, a duty cycle of a radio signal sensed in said particular radio channel, and an expected duration of a radio signal sensed in said particular radio channel.

8. The method of claim 1 wherein said sensing element is at least one of a wireless user equipment device, a base station, a serving network node, a relay node, a femto cell, and an access point.

9. The method of claim 1 wherein said at least one radio element comprises a wireless user equipment device.

10. The method of claim 1 further comprising issuing a periodic challenge to said sensing element and validating a response received from said sensing element responsive to said periodic challenge.

11. The method of claim 1 wherein said network node is a trusted node of said radio network, said trusted node being a node to which said sensing element has subscribed.

12. The method of claim 1 wherein said sensory report has been scrambled by a subscriber identifier of said sensing element.

13. The method of claim 1 wherein said sensory report is received via a screening node associated with said radio network, said screening node comprising at least one of a base station, an evolved node and a trusted node of said radio network.

14. The method of claim 1 further comprising transmitting a control message, responsive at least in part to said correlated sensory report, to another network node, said control message for effectuating allocation of a radio resource to at least one of said at least one radio element and said sensing element.

15. The method of claim 1 wherein said correlating said sensory report is based on using at least one of time stamp information associated with said one or more previous sensory reports from said sensing element and time stamp information associated with said one or more previous sensory reports from said another sensing element.

16. An apparatus associated with a network node for processing sensory reports of one or more sensing elements disposed in a radio network, said apparatus comprising:
    a processor; and
    a nonvolatile memory having instructions thereon for execution by said processor and configured to:
    obtain a sensory report from a sensing element operating in multiple radio access technologies, said sensory report including sensory data associated with multiple radio channels relative to at least one radio element;
    identify said sensing element's identity and to determine if said sensory report has been tagged with a code generated by a predetermined code generator; and
    authenticate said sensory report, and responsive to said authentication, correlate said sensory report from said sensing element with at least one of one or more previous sensory reports from said sensing element and one or more previous sensory reports received from another sensing element to facilitate alleviating interference or congestion.

17. The apparatus of claim 16 wherein said nonvolatile memory having instructions further includes instructions configured to upload said correlated sensory report to at least one of a local database and a remote database of a distributed channel occupancy and location database system associated with said radio network and an external database having channel occupancy data relating to an unlicensed spectrum.

18. The apparatus of claim 16 wherein said nonvolatile memory having instructions further includes instructions configured to generate a control message to said sensing element, responsive at least in part to said correlated sensory report, said control message for effectuating allocation of a radio resource to said sensing element.

19. The apparatus of claim 16 wherein said nonvolatile memory having instructions further includes instructions configured to generate a control message to said at least one radio element, responsive at least in part to said correlated sensory report, said control message for effectuating allocation of a radio resource to said at least one radio element.

20. The apparatus of claim 16 wherein said sensing element's identity comprises at least one of a radio network temporary identifier and a serial number.

21. The apparatus of claim 16 wherein said nonvolatile memory having instructions further includes instructions configured to determine that said code for tagging said sensory report was generated based on a changing perturbation of said sensing element's identity.

22. The apparatus of claim 16 wherein said sensory report includes data associated with a particular radio channel of said multiple radio channels, said data comprising at least one of: a location of said at least one radio element operating in said particular radio channel, an interference level of said particular radio channel, an interference signal bandwidth, a center frequency of a radio signal sensed in said particular radio channel, an type identification of a radio signal sensed in said particular radio channel, a radio access technology type associated with said particular radio channel, a network identifier associated with said particular radio channel, a transmitter identifier associated with said particular radio channel, a duty cycle of a radio signal sensed in said particular radio channel, and an expected duration of a radio signal sensed in said particular radio channel.

23. The apparatus of claim 16 wherein said nonvolatile memory having instructions further includes instructions configured to issue a periodic challenge to said sensing element and to validate a response received from said sensing element responsive to said periodic challenge.

24. The apparatus of claim 16 wherein said nonvolatile memory having instructions further includes instructions configured to determine that said sensing element is a subscriber to a trusted node of said radio network.

25. The apparatus of claim 16 wherein said nonvolatile memory having instructions further includes instructions configured to determine that said sensory report has been scrambled by a subscriber identifier of said sensing element.

26. The apparatus of claim 16 wherein said nonvolatile memory having instructions further includes instructions configured to determine that said sensory report is received from said sensing element, wherein said sensing element is a mobile device that operates as a proxy agent on behalf of another mobile device.

27. The apparatus of claim 16 wherein said nonvolatile memory having instructions further includes instructions configured to determine that said sensory report is received via a screening node associated with said radio network, said screening node comprising at least one of a base station, an evolved node and a trusted node of said radio network.

28. The apparatus of claim 16 wherein said nonvolatile memory having instructions further includes instructions configured to generate a control message, responsive at least in part to said correlated sensory report, to another network node, said control message for effectuating allocation of a radio resource to at least one of said at least one radio element and said sensing element.

29. The apparatus of claim 16 wherein said instructions configured to correlate said sensory report are further configured to correlate said sensory report based on using time stamp information associated with said one or more previous sensory reports from said sensing element.

30. The apparatus of claim 16 wherein instructions configured to correlate said sensory report are further configured to correlate said sensory report based on using time stamp information associated with said one or more previous sensory reports from said another sensing element.

* * * * *